(12) United States Patent
Lee et al.

(10) Patent No.: US 12,556,949 B2
(45) Date of Patent: Feb. 17, 2026

(54) METHOD AND DEVICE FOR COMMUNICATION USING FRONTHAUL INTERFACE

(71) Applicant: ELECTRONICS AND TELECOMMUNICATIONS RESEARCH INSTITUTE, Daejeon (KR)

(72) Inventors: Jae Seung Lee, Daejeon (KR); Moon Sik Lee, Daejeon (KR); Jae Woo Park, Daejeon (KR); Jee Yon Choi, Daejeon (KR); Young Hoon Kim, Daejeon (KR); Ju Ho Park, Daejeon (KR); Hoo Sung Lee, Daejeon (KR); Young Il Jeon, Daejeon (KR); Chan Bok Jeong, Daejeon (KR); Hyung Sik Ju, Daejeon (KR); Ik Jae Chun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 365 days.

(21) Appl. No.: 18/036,534

(22) PCT Filed: Nov. 19, 2021

(86) PCT No.: PCT/KR2021/017105
§ 371 (c)(1),
(2) Date: May 11, 2023

(87) PCT Pub. No.: WO2022/108393
PCT Pub. Date: May 27, 2022

(65) Prior Publication Data
US 2024/0015539 A1 Jan. 11, 2024

(30) Foreign Application Priority Data

Nov. 20, 2020 (KR) .................. 10-2020-0156851
May 31, 2021 (KR) .................. 10-2021-0070213
(Continued)

(51) Int. Cl.
*H04W 24/08* (2009.01)
*H04W 24/10* (2009.01)
*H04W 88/08* (2009.01)

(52) U.S. Cl.
CPC .......... *H04W 24/08* (2013.01); *H04W 24/10* (2013.01); *H04W 88/085* (2013.01)

(58) Field of Classification Search
CPC ... H04W 24/08; H04W 24/10; H04W 88/085; H04W 24/02; H04W 80/00; H04W 88/08; H04W 92/00
See application file for complete search history.

(56) References Cited

U.S. PATENT DOCUMENTS 10,631,346 B2  4/2020 Hampel et al.
10,833,736 B2  11/2020 Hong et al.
(Continued)

FOREIGN PATENT DOCUMENTS

CN  109587722 A   4/2019
EP  3386247 A1   10/2018
(Continued)

OTHER PUBLICATIONS

3GPP, "3rd Generation Partnership Project; Technical Specification Group Radio Access Network; NG-RAN; F1 application protocol (F1AP) (Release 16)", 3GPP TS38.473 V16.3.1 (Oct. 2020).
(Continued)

*Primary Examiner* — Ayman A Abaza
*Assistant Examiner* — Alyssa Williams
(74) *Attorney, Agent, or Firm* — LRK PATENT LAW FIRM

(57) ABSTRACT

A communication system including a fronthaul interface is provided. In one embodiment, an operation method of an O-RU includes generating a plurality of first measurement results by performing measurement operations on a first
(Continued)

measurement target in a single notification period according to a notification interval, generating a first measurement result list including the plurality of first measurement results, and transmitting, to an O-DU, a message including the first measurement result list.

20 Claims, 15 Drawing Sheets

(30) Foreign Application Priority Data

Jun. 22, 2021 (KR) .......................... 10-2021-0081163
Jun. 25, 2021 (KR) .......................... 10-2021-0083430
Nov. 19, 2021 (KR) .......................... 10-2021-0160299

(56) References Cited

U.S. PATENT DOCUMENTS

| 10,869,243 | B2 | 12/2020 | Kim |
| 2020/0077287 | A1 | 3/2020 | Prasad et al. |
| 2020/0177242 | A1 | 6/2020 | Kim et al. |
| 2020/0235788 | A1 | 7/2020 | Rajagopal et al. |
| 2020/0351688 | A1 | 11/2020 | Siomina |
| 2020/0374958 | A1 | 11/2020 | Liu et al. |
| 2020/0389806 | A1 | 12/2020 | Charipadi et al. |
| 2021/0006371 | A1 | 1/2021 | Raghothaman et al. |
| 2021/0385686 | A1* | 12/2021 | Ahmed .................. H04W 28/06 |
| 2022/0408294 | A1* | 12/2022 | Lee ......................... H04W 4/40 |
| 2022/0408390 | A1* | 12/2022 | Hiratsuka ............. H04W 24/02 |
| 2023/0239824 | A1* | 7/2023 | Teshima ........... H04W 56/0055 |
| | | | 370/350 |

FOREIGN PATENT DOCUMENTS

| EP | 3448080 A1 | 2/2019 |
| WO | 2019062866 A1 | 4/2019 |
| WO | 2020/217989 A1 | 10/2020 |

OTHER PUBLICATIONS

"O-RAN Alliance Working Group 4 Management Plane Specification", O-RAN-WG4.MP.0-v05.00, 2021.

Huawei, "Clarification to 38.473 on measurement gap deactivation over F1AP (Rel-16)", 3GPP TSG-RAN WG3 #109-e, R3-205277, Aug. 17-28, 2020 E-Meeting.

Search Report, mailed Mar. 8, 2022, for International Application No. PCT/KR2021/017105.

Written Opinion, mailed Mar. 8, 2022, for International Application No. PCT/KR2021/017105.

O-RAN WG5. "LS on O-RAN—3GPP Cooperation on Management Services", 3GPP TSG RAN Meeting $86, RP-192385, Sitges, Spain, Dec. 9-12, 2019.

* cited by examiner

METHOD AND DEVICE FOR COMMUNICATION USING FRONTHAUL INTERFACE

TECHNICAL FIELD

The present disclosure relates to a communication technique in a communication system including fronthaul interfaces, and more particularly, to a technique of efficiently transmitting and receiving parameters for managing performance of a communication system.

BACKGROUND ART

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like.

Meanwhile, the open-radio access network (O-RAN) alliance specifies fronthaul interfaces. The fronthaul interface may be an interface between an O-RAN distributed unit (O-DU) and an O-RAN radio unit (O-RU) constituting a base station (e.g., eNB or gNB). The O-DU may be referred to as a lower layer split-central unit (LLS-CU), and the O-RU may be referred to as a lower layer split-distributed unit (LLS-DU). The LLS-CU and LLS-DU may be terms used in the 3GPP. Methods for performance management of a communication system including fronthaul interfaces may be required. In particular, for an M-Plane function of the O-RAN, methods for transmitting and receiving various parameters for performance management between the O-RU and the O-DU may be required.

DISCLOSURE

Technical Problem

An objective of the present disclosure for solving the above-described problem is to provide a method and an apparatus for transmitting and receiving parameters for managing performance in a communication system including fronthaul interfaces.

Technical Solution

An operation method of an O-RU, according to a first exemplary embodiment of the present disclosure for achieving the objective, may comprise: generating a plurality of first measurement results by performing a measurement operation on a first measurement object in one notification period according to a notification interval; generating a first measurement result list including the plurality of first measurement results; and transmitting a message including the first measurement result list to an O-RAN distributed unit (O-DU).

The operation method may further comprise generating a first notification including a most recent measurement result among the plurality of first measurement results, wherein the message further includes the first notification.

The first measurement result list may be decoded by an O-DU supporting a version after a specific version of the O-RAN, and the first notification may be decoded by an O-DU supporting a version before the specific version.

The operation method may further comprise: generating a plurality of second measurement results by performing a measurement operation on a second measurement object in the one notification period; and generating a second measurement result list including the plurality of second measurement results, wherein the message further includes the second measurement result list.

The first measurement result list may further include information on a measurement start time and a measurement end time for each of the plurality of first measurement results.

The plurality of first measurement results may be arranged in ascending order of measurement time in the first measurement result list.

The first measurement result list may further include at least one of information indicating a number of the plurality of first measurement results and a sequence number of each of the plurality of first measurement results.

The notification interval may be set by the O-DU to be longer than a measurement interval at which one measurement operation is performed.

The first measurement object may be a transceiver, a reception window (rx-window), a transmission measurement (tx-measurement), 'energy, power, environmental (EPE)', or a symbol received signal strength indicator (RSSI).

An operation method of an O-RU, according to a second exemplary embodiment of the present disclosure for achieving the objective, may comprise: generating a first measurement result by performing a measurement operation on a first measurement object in one notification period according to a notification interval; generating a first notification including the first measurement result; generating a first measurement result list including the first measurement result; and transmitting a message including the first notification and the first measurement result list to an O-RAN distributed unit (O-DU).

The first measurement result list may be decoded by an O-DU supporting a version after a specific version of the O-RAN, and the first notification may be decoded by an O-DU supporting a version before the specific version.

The notification interval may be set by the O-DU to be equal to a measurement interval at which one measurement operation is performed.

The operation method may further comprise: generating a second measurement result by performing a measurement operation on a second measurement object in the one notification period; generating a second notification including the second measurement result; and generating a second measurement result list including the second measurement result, wherein the message further includes the second notification and the second measurement result list.

An operation method of an O-DU, according to a third exemplary embodiment of the present disclosure for achieving the objective, may comprise: setting a notification interval and a measurement interval for an O-RAN radio unit (O-RU); receiving, from the O-RU, a message including a first measurement result list including a plurality of first measurement results for a first measurement object; and identifying the plurality of first measurement results by decoding the first measurement result list, wherein the plurality of first measurement results are measured in one notification period according to the notification interval.

The message may further include a first notification including a most recent measurement result among the plurality of first measurement results.

The first measurement result list may be decoded by an O-DU supporting a version after a specific version of the O-RAN, and the first notification may be decoded by an O-DU supporting a version before the specific version.

The first measurement result list may further include information on a measurement start time and a measurement end time of each of the plurality of first measurement results.

The plurality of first measurement results may be arranged in ascending order of measurement time in the first measurement result list.

The first measurement result list may further include at least one of information indicating a number of the plurality of first measurement results and a sequence number of each of the plurality of first measurement results.

The first measurement object may be a transceiver, a reception window (rx-window), a transmission measurement (tx-measurement), 'energy, power, environmental (EPE)', or a symbol received signal strength indicator (RSSI).

Advantageous Effects

According to the present disclosure, various parameters for performance management may be efficiently transmitted/received between an O-RU and an O-DU. According to a YANG model defined in an M-Plane of the O-RAN, a plurality of measurement results (e.g., a plurality of measurement results for the respective measurement objects) may be transmitted using a single notification message. This operation may not affect the functions of the existing M-Plane. Accordingly, the performance of the communication system including fronthaul interfaces can be improved.

MODES OF THE INVENTION

Figure 1:
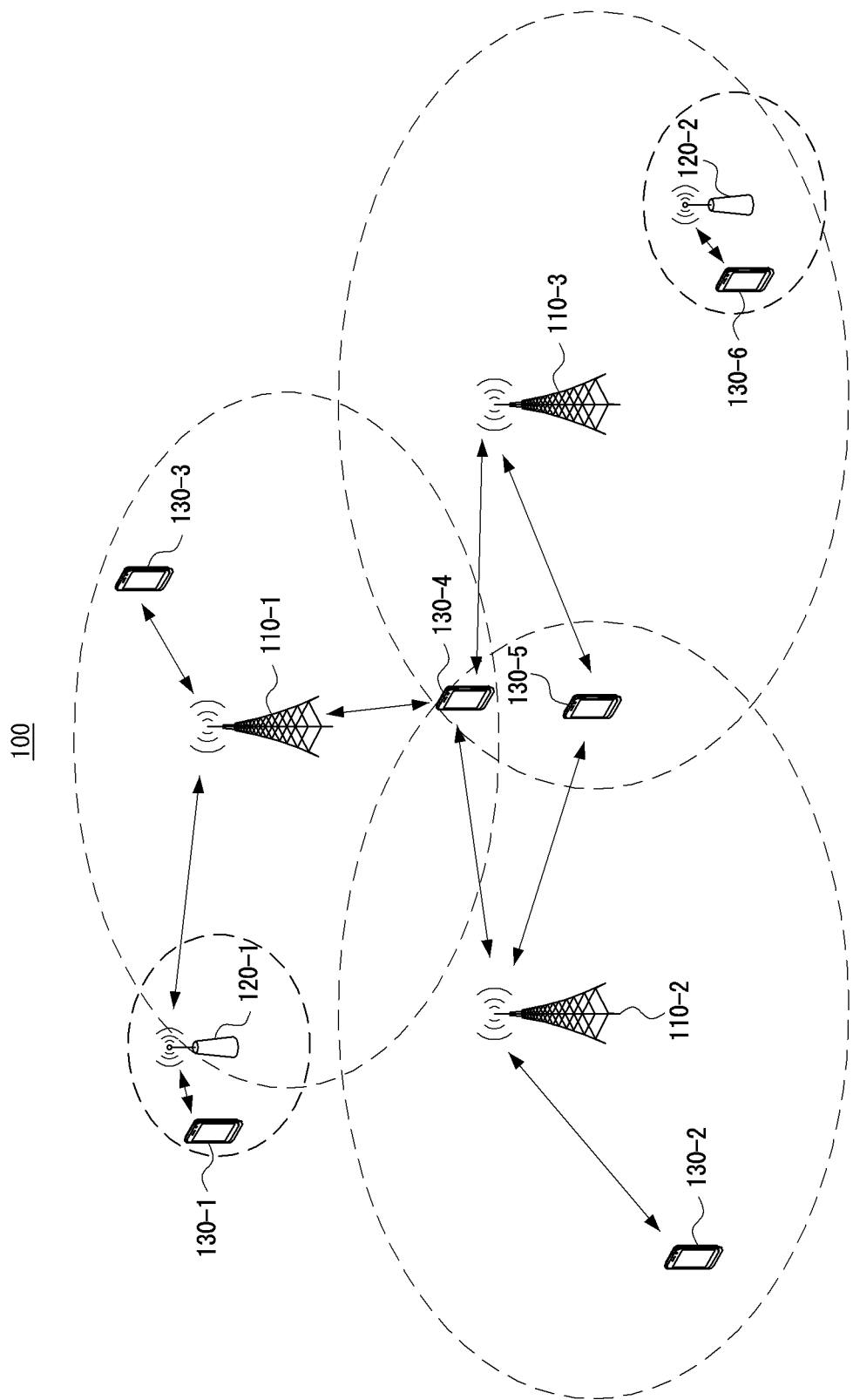
FIG. 1 is a conceptual diagram illustrating a first exemplary embodiment of a communication system.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The LTE' may refer to the 4G communication system, LTE communication system, or LTE-A communication system, and the 'NR' may refer to the 5G communication system or NR communication system.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
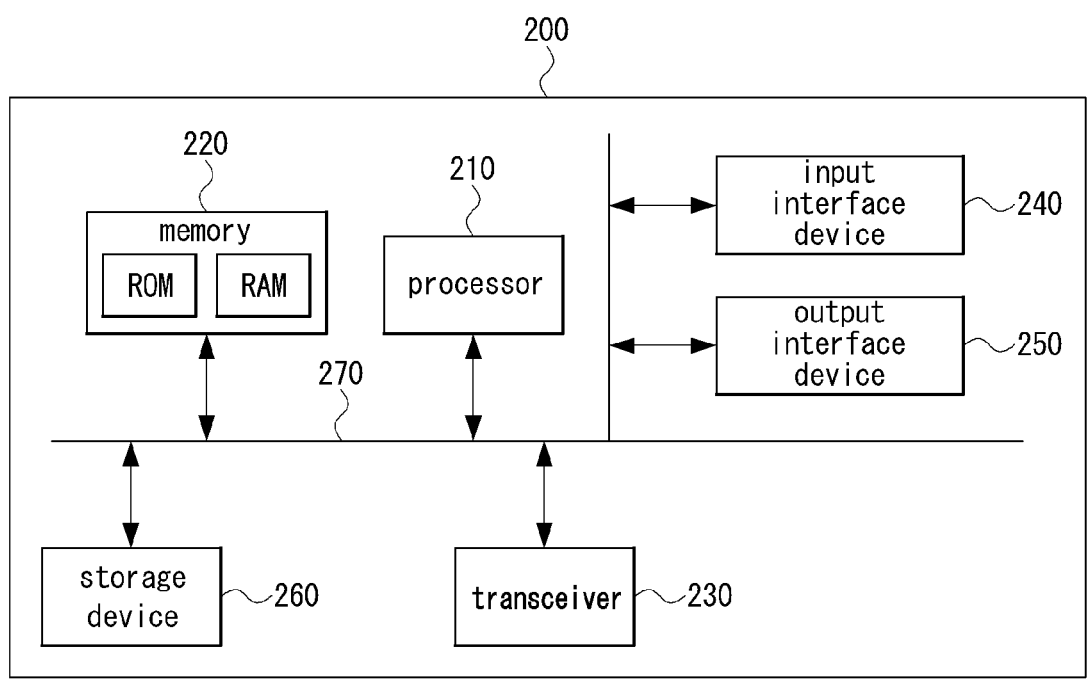
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, in a communication system, a base station (e.g., eNB or gNB) may support fronthaul interfaces. Here, the fronthaul interface may be a fronthaul interface defined by the O-RAN alliance. In this case, the base station may include an O-DU and one or more O-RUs. Communications between the O-DU and the one or more O-RUs may be performed through fronthaul interfaces. The O-DU may be a LLS-CU specified by the 3GPP, and the O-RU may be a LLS-DU specified by the 3GPP. Each of the O-DU and O-RU may be configured identically or similarly to the communication node 200 shown in FIG. 2.

Hereinafter, fronthaul communication methods will be described. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of an O-DU is described, a corresponding O-RU may perform an operation corresponding to the operation of the O-DU. Conversely, when an operation of an O-RU is described, a corresponding O-DU may perform an operation corresponding to the operation of the O-RU.

Figure 3:
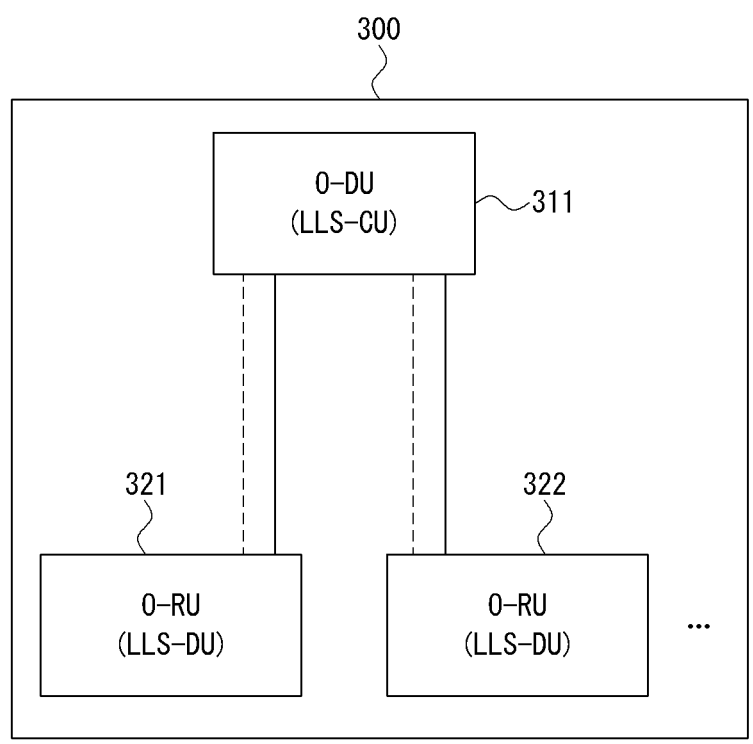
FIG. 3 is a block diagram illustrating a first exemplary embodiment of a base station supporting lower layer split (LLS) in a communication system.

FIG. 3 is a block diagram illustrating a first exemplary embodiment of a base station supporting lower layer split (LLS) in a communication system.

Referring to FIG. 3, a base station 300 may include an O-DU 311, an O-RU #1 321, an O-RU #2 322, and the like. For example, the base station 300 may include a plurality of O-RUs. Communications between the O-DU 311 and the O-RUs 321 and 322 may be performed through fronthaul interfaces. The fronthaul interface may include an LLS-control plane and an LLS-user plane. The LLS-control plane may be referred to as 'LLS-C' or 'LLS-C-Plane' and the LLS-user plane may be referred to as 'LLS-U' or 'LLS-U-Plane'.

The O-DU 311 may be a logical node that performs a radio link control (RLC) layer function, a medium access control (MAC) layer function, and/or a high-physical (high-PHY) layer function. The O-DU 311 may control the plurality of O-RUs 321 and 322. Each of the O-RUs 321 and 322 may be a logical node that performs a low-PHY layer function and/or a radio frequency (RF) processing function. The O-RUs 321 and 322 may transmit/receive control information and/or data by performing communication with the O-DU 311. The control information may be real-time control information. The data may be user plane data. The O-RUs 321 and 322 may operate based on controls of the O-DU 311.

Figure 4:
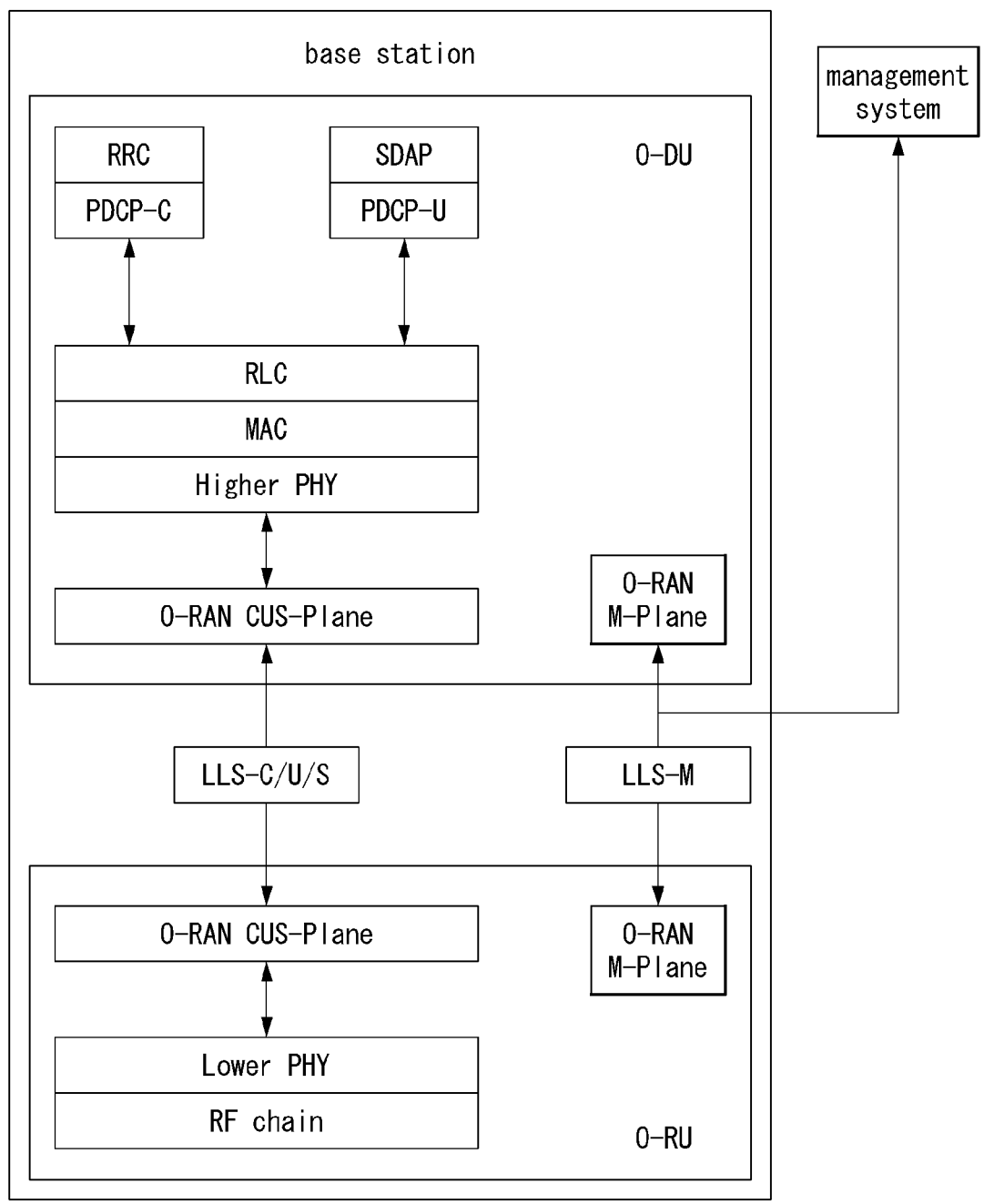
FIG. 4 is a block diagram illustrating a first exemplary embodiment of an interface structure between an O-DU and an O-RU in a communication system.

FIG. 4 is a block diagram illustrating a first exemplary embodiment of an interface structure between an O-DU and an O-RU in a communication system.

Referring to FIG. 4, each of the O-DU and O-RU may include a CUS-Plane (e.g., O-RAN CUS-Plane), and may perform communication according to CUS-Plane functions. In addition, each of the O-DU and O-RU may include a management (M)-Plane (e.g., O-RAN M-Plane), and may perform communication according to M-Plane functions. That is, the O-DU and O-RU may perform the M-Plane functions as well as the CUS-Plane functions. The M-Plane functions may support initialization, configuration, management, etc. of the O-RU. The M-Plane may use open interfaces based on a NETCONF and/or YANG model (hereinafter referred to as 'NETCONF/YANG model'). The M-Plane may support start up installation, software management, configuration management, performance management, fault management, file management, and the like. The M-Plane structure in the O-RAN may be as follows.

Figure 5A:
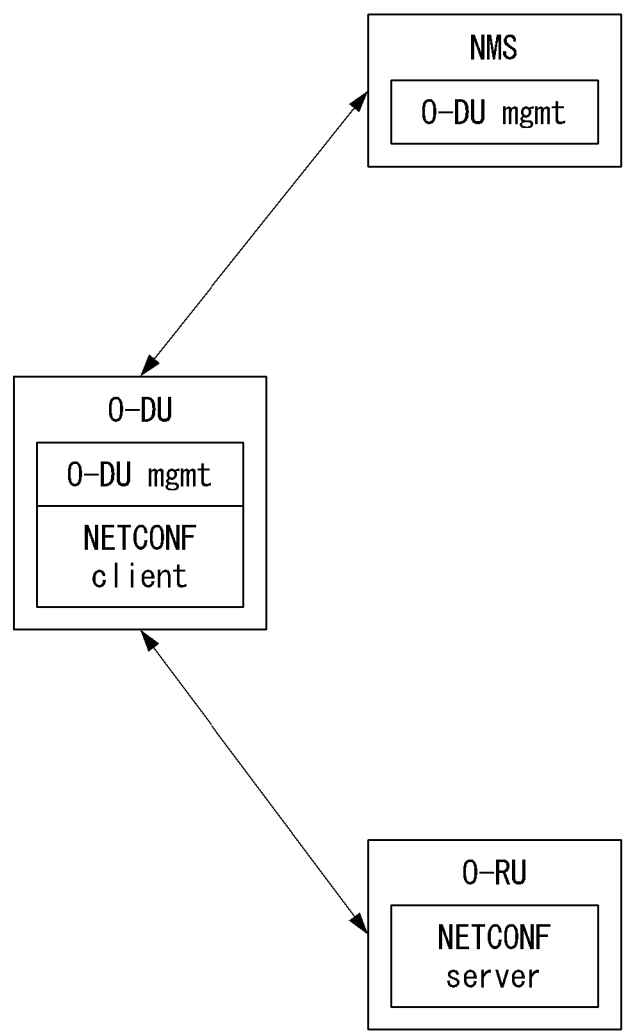
FIG. 5A is a block diagram illustrating a first exemplary embodiment of a hierarchical M-Plane model.
Figure 5B:
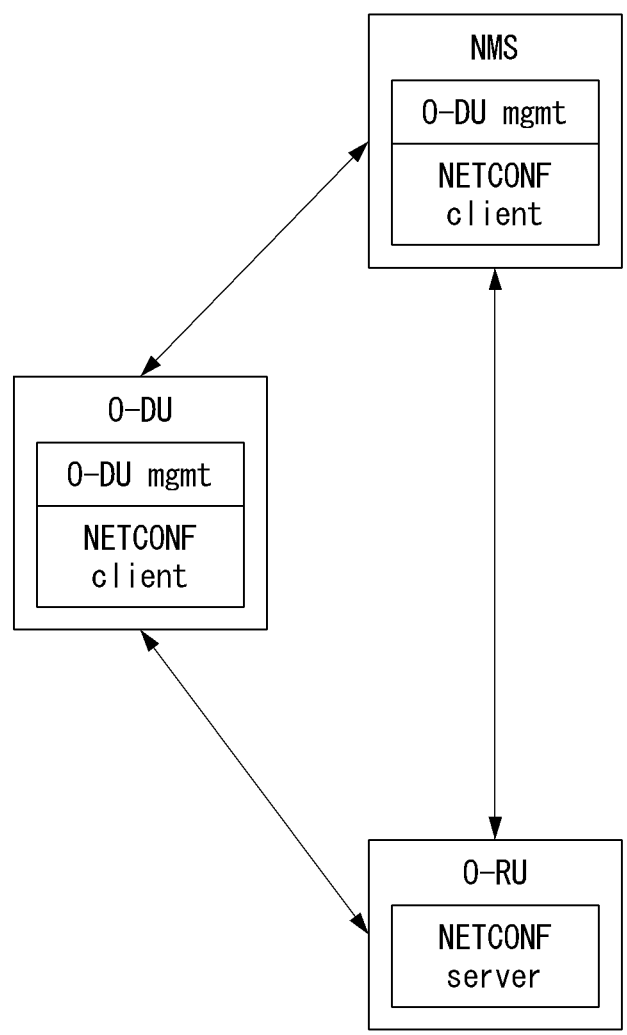
FIG. 5B is a block diagram illustrating a second exemplary embodiment of a hybrid M-Plane model.

FIG. 5A is a block diagram illustrating a first exemplary embodiment of a hierarchical M-Plane model, and FIG. 5B is a block diagram illustrating a second exemplary embodiment of a hybrid M-Plane model.

Referring to FIG. 5A, in the hierarchical M-Plane model, an O-RU may be managed by one or more O-DUs. A NETCONF-based M-Plane interface may be used between the O-DU and the O-RU. An interface between the O-DU and a network management system (NMS) may exist, but the NMS may not directly manage the O-RU. That is, the NMS may manage the O-RU through the O-DU. A direct interface between the O-RU and the NMS may not exist. The NMS may refer to a management system shown in FIG. 4.

Referring to FIG. 5B, in the hybrid M-Plane model, there may be a direct logical interface between the NMS and the O-RU as well as the logical interface between the O-DU and the O-RU. The NMS may support a software management function, a performance management function, a configuration management function, and/or a fault management function for the O-RU. The NMS and the O-RU may have end-to-end Internet protocol (IP) layer connectivity.

Figure 6:
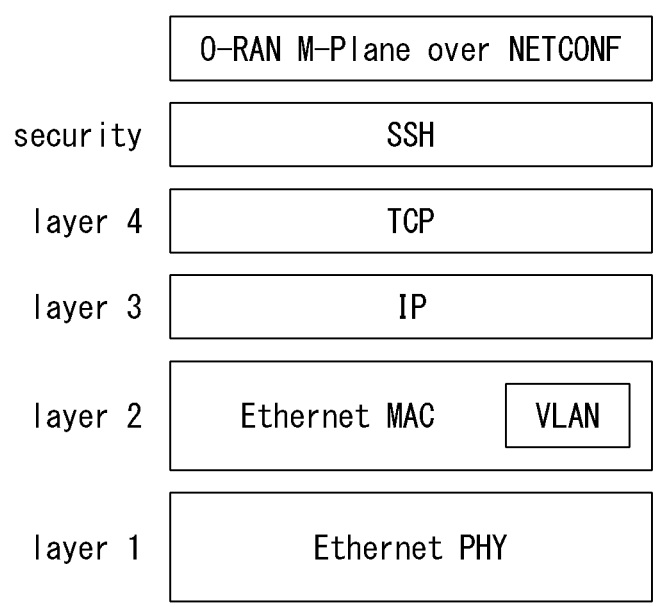
FIG. 6 is a block diagram illustrating a first exemplary embodiment of a protocol stack of M-Plane.

FIG. 6 is a block diagram illustrating a first exemplary embodiment of a protocol stack of M-Plane.

Referring to FIG. 6, a transport network layer may operate above the IP transport layer. A transmission control protocol (TCP)/secure shell (SSH) layer may be used to transmit/receive M-Plane messages between the O-DU/NMS and the O-RU.

The NETCONF/YANG model may be used as a network element management protocol and a data modeling language. The NETCONF/YANG model may support an open management scheme for efficient integration and management between multi-vendor O-RU/O-DUs.

The NETCONF may obtain configuration state information and may support a configuration change operation. In addition, the NETCONF may deliver a message in form of an XML-RPC over the transport layer (e.g., SSH layer) that provides a secure transport. Each of a 'get' RPC operation and a 'get-config' RPC operation may be used to obtain all of configurations, a part of the configurations, all of state data, and/or a part of the state data. An edit-config operation may be used to change, add, and/or delete configuration elements in a configuration data store.

A notification support in the NETCONF may be based on an event stream. A NETCONF client (e.g., O-DU) may desire to receive a notification for a specific event. In this case, when a subscription to the corresponding event stream is requested, a create-subscription operation may be used.

The performance management function may be a main function of the M-Plane. The performance management function may be a function for optimizing operations of the O-RU. The O-DU (e.g., NETCONF client) may use the NETCONF/YANG model to collect O-RU operation related information (e.g., transceiver, reception window (i.e., rx-window), transmission window (i.e., tx-window), 'energy, power, and environmental (EPE)', received signal strength indicator (RSSI) (e.g., symbol RSSI), and/or the like). For example, the O-DU may collect configuration and/or state information for performance management.

Measurement objects (e.g., TX_POWER, RX_POWER, RX_ON_TIME, TX_TOTAL, etc.) defined and/or used in the O-RAN specification for performance management may be managed as being classified into five or more measurement groups (e.g., transceiver statistics (transceiver-stats) group, reception window statistics (rx-window-stats) group, transmission measurement statistics (tx-measurement-stats) group, EPE statistics (epe-stats) group, RSSI statistics (rssi-stats) group, etc.). The RSSI statistics group may be a symbol RSSI statistics group. A measurement-interval may be independently set for each measurement group. For example, the measurement interval may be different for each measurement group. A transceiver measurement interval (i.e., transceiver-measurement-interval), a reception window measurement interval (i.e., rx-window-measurement-interval), a transmission measurement interval (i.e., tx-measurement-interval), EPE measurement interval (i.e., epe-measurement interval), and/or RSSI measurement interval (i.e., rssi-measurement-interval) may be set independently of each other.

A measurement result (e.g., measurement value) measured by the O-RU according to each measurement interval set by the O-DU (e.g., NETCONF client) may be transmitted using a NETCONF notification mechanism at a time according to a notification interval. For example, the O-RU may periodically transmit measurement results to the O-DU. Alternatively, the O-RU may store a measurement result for each measurement time in a local disk, and upload the measurement results to the O-DU at a time according to a file-upload-interval. In this case, the notification interval may be set differently from the measurement interval. In an exemplary embodiment, the measurement interval may refer to a measurement period, the notification interval may refer to a notification period, and a 'transmission/reception operation of a notification' may refer to a 'transmission/reception operation of a notification message'.

For example, a measurement interval of a measurement object #A may be set to 3 minutes, and a measurement interval of a measurement object #B may be set to 5 minutes. In order to efficiently perform a transmission operation of performance management information, the notification interval may be set to 15 minutes. In this case, in the NETCONF notification transmission procedure, it may be preferable to transmit one notification (e.g., one notification message) including five measurement results for the measurement object #A and three measurement results for the measurement object #B. When the notification interval is set longer than the measurement interval for a specific measurement object, a plurality of measurement results may exist in the O-RU at a time of transmission of the notification. The plurality of measurement results for the specific measurement object may be included in one notification.

The existing YANG model defined in the M-Plane of the O-RAN may not support the transmission/reception operation of one notification including a plurality of measurement results. In an exemplary embodiment, the 'operation of transmitting and receiving one notification including a plurality of measurement results' may be referred to as a 'multi-measurement result reporting function'. That is, the existing YANG model may transmit one notification including one measurement result for each measurement object. Therefore, when the notification interval is set longer than the measurement interval of the measurement object, a notification including only one measurement result may be transmitted, and the remaining measurement result(s) may not be delivered to the O-DU (e.g., NETCONF client) in the corresponding notification interval. Methods for solving the above-mentioned problems will be described below.

Regarding performance management in the O-RAN M-Plane (hereinafter referred to as 'O-RAN M-Plane'), an interface and configuration information between the O-DU and O-RU may be defined in a 'o-ran-performance-management.yang' module. In the O-RAN M-Plane, a format for management information transmitted and received between devices and a transmission procedure of the management information may be defined using the NETCONF/YANG model.

In Tables 1 and 2 below, main parameters used for performance management in the o-ran-performance-management.yang module may be defined. Other parameters may be added to Tables 1 and 2 according to updates of the O-RAN specifications, and parameter(s) defined in Tables 1 and 2 may be changed.

TABLE 1

| measurement-group | measurement-object | report-info | object-unit |
|---|---|---|---|
| transceiver-stats | RX_POWER, RX_POWER_LANE_2, RX_POWER_LANE_3, RX_POWER_LANE_4, TX_POWER, TX_POWER_LANE_2, TX_POWER_LANE_3, TX_POWER_LANE_4 TX_BIAS_COUNT, TX_BIAS_COUNT_LANE_2, TX_BIAS_COUNT_LANE_3, TX_BIAS_COUNT_LANE_4 VOLTAGE, TEMPARATURE | max and time min and time first and time latest and time frequency-table | PORT_NUMBER |
| rx-window-stats | RX_ON_TIME, RX_EARLY, RX_LATE, RX_CORRUPT, RX_DUPL, RX_TOTAL, RX_ON_TIME_C, RX_EARLY_C, RX_LATE_C, RX_SEQID_ERR, RX_SEQID_ERR_C, RX_ERR_DROP | Count | RU, TRANSPORT (transport flow name), or EAXC_ID |

TABLE 2

| measurement-group | measurement-object | report-info | object-unit |
|---|---|---|---|
| tx-window-stats | TX_TOTAL, TX_TOTAL_C | Count | RU, TRANSPORT, or EAXC_ID |
| epe-stats | POWER, TEMPERATURE, VOLTAGE, CURRENT | max min average | Hardware component type, e.g., O-RAN-RADIO, O-RU-POWER-AMPLIFIER, O-RU-FPGA, power-supply, fan, cpu |
| symbol-rssi-stats | ALL_UL_SYMBOLS, CONFIGURED_SYMBOLS | max min avg frequency-table | rx-array-carrier |

The O-DU (e.g., NETCONF client) may configure measurement object(s), value(s) included in information to be reported (i.e., report-info) (e.g., maximum value, minimum value, count, etc.), an object-unit, a measurement interval, a notification interval, and/or a file upload interval. The O-DU may inform the O-RU of the configuration information. The O-RU may perform measurement at the set measurement interval for the selected measurement object(s) according to the information (e.g., values) configured by the O-DU, and may transmit a notification including measurement results according to the set notification interval or upload a measurement result file including the measurement results according to the set file upload interval.

A measurement interval for measurement object(s) may be set for each measurement group. For example, the transceiver measurement interval, the reception window measurement interval, the transmission measurement interval, the EPE measurement interval, and the RSSI measurement interval may be set independently of each other.

Measurement may be activated for each measurement object. The O-DU may configure information element(s) included in the reported information (i.e., report-info) for each measurement object. For example, the reported information may include a plurality of information elements. The information element(s) may include MAXIMUM, MINIMUM, FIRST, LATEST, and/or FREQUENCY TABLE. The object-unit may be independently set for each measurement object. For example, the object-unit may be different for each measurement object.

Figure 7:
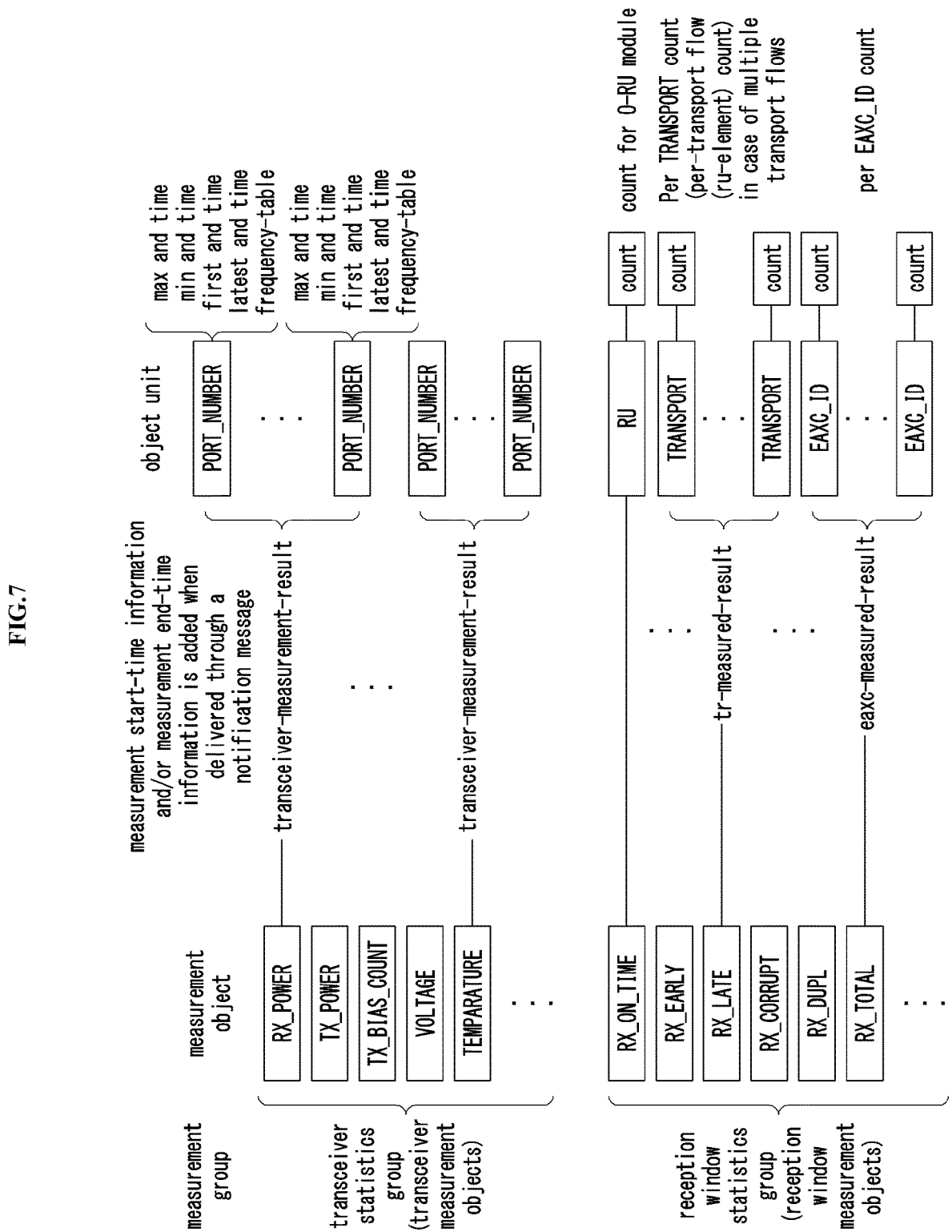
FIG. 7 is a conceptual diagram illustrating a first exemplary embodiment of a data structure of a YANG model for delivery of performance measurement results in the O-RAN M-Plane.

FIG. 7 is a conceptual diagram illustrating a first exemplary embodiment of a data structure of a YANG model for delivery of performance measurement results in the O-RAN M-Plane.

Referring to FIG. 7, the O-RU may store measurement results for measurement objects belonging to each of the transceiver statistics group and the reception window statistics group in a data store based on the YANG model. The O-RU may transmit a NETCONF notification including the measurement result(s) to the O-DU (e.g., NETCONF client). The transceiver statistics group may be referred to as transceiver measurement objects, and the reception window statistics group may be referred to as reception window measurement objects. Activation for each measurement object may be set to TRUE or FALSE. A default of the activation for each measurement object may be FALSE. A count value may start from 0 at a boundary of the measurement interval.

Figure 8:
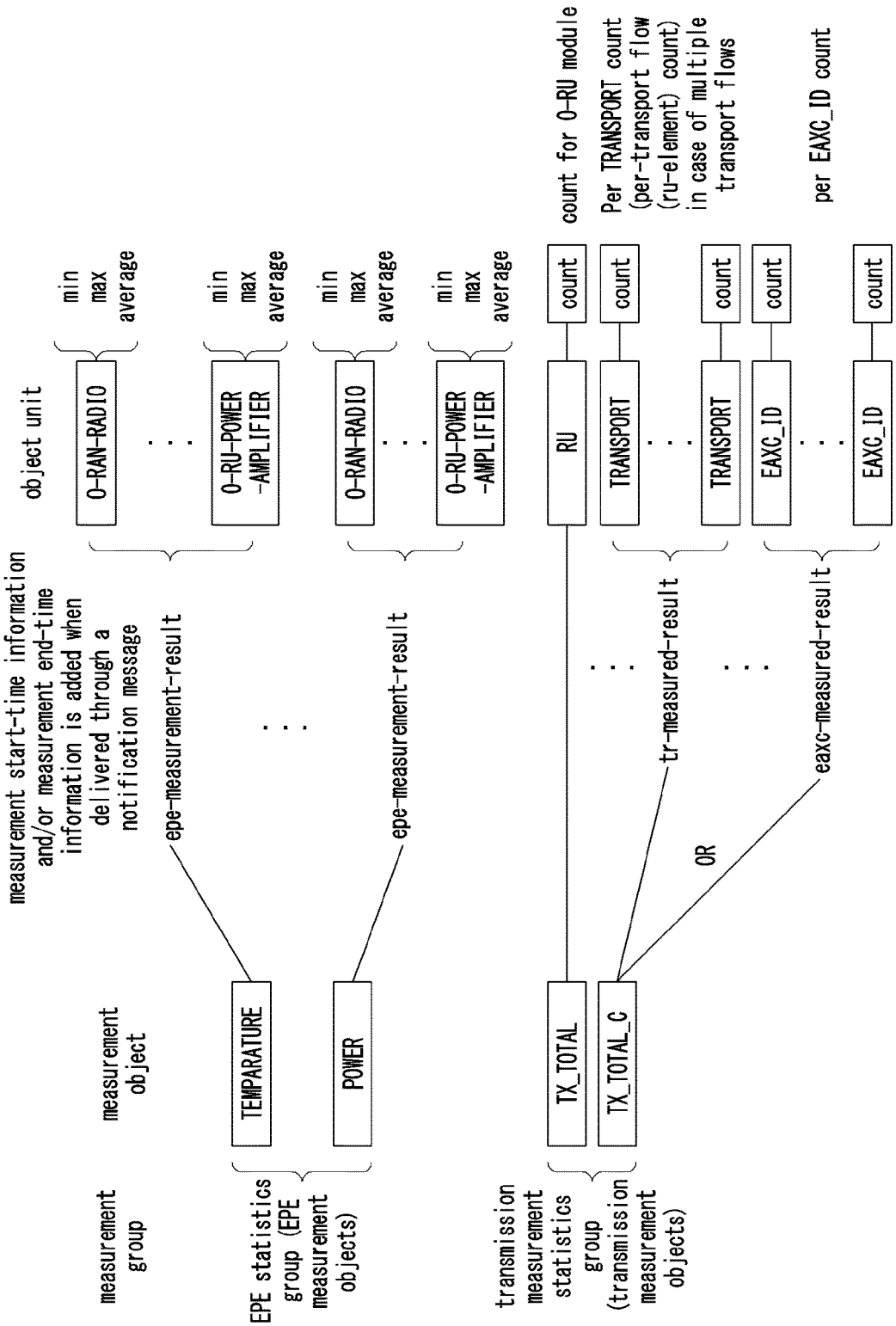
FIG. 8 is a conceptual diagram illustrating a second exemplary embodiment of a data structure of a YANG model for delivery of performance measurement results in the O-RAN M-Plane.

FIG. 8 is a conceptual diagram illustrating a second exemplary embodiment of a data structure of a YANG model for delivery of performance measurement results in the O-RAN M-Plane.

Referring to FIG. 8, the O-RU may store measurement results for measurement objects belonging to each of the EPE statistics group and the transmission measurement statistics group in a data store based on the YANG model. The O-RU may transmit a NETCONF notification including the measurement result(s) to the O-DU (e.g., NETCONF client). The EPE statistics group may be referred to as EPE measurement objects, and the transmission measurement statistics group may be referred to as transmission measurement objects. Activation for each measurement object may be set to TRUE or FALSE. A default of the activation for each measurement object may be FALSE.

Figure 9:
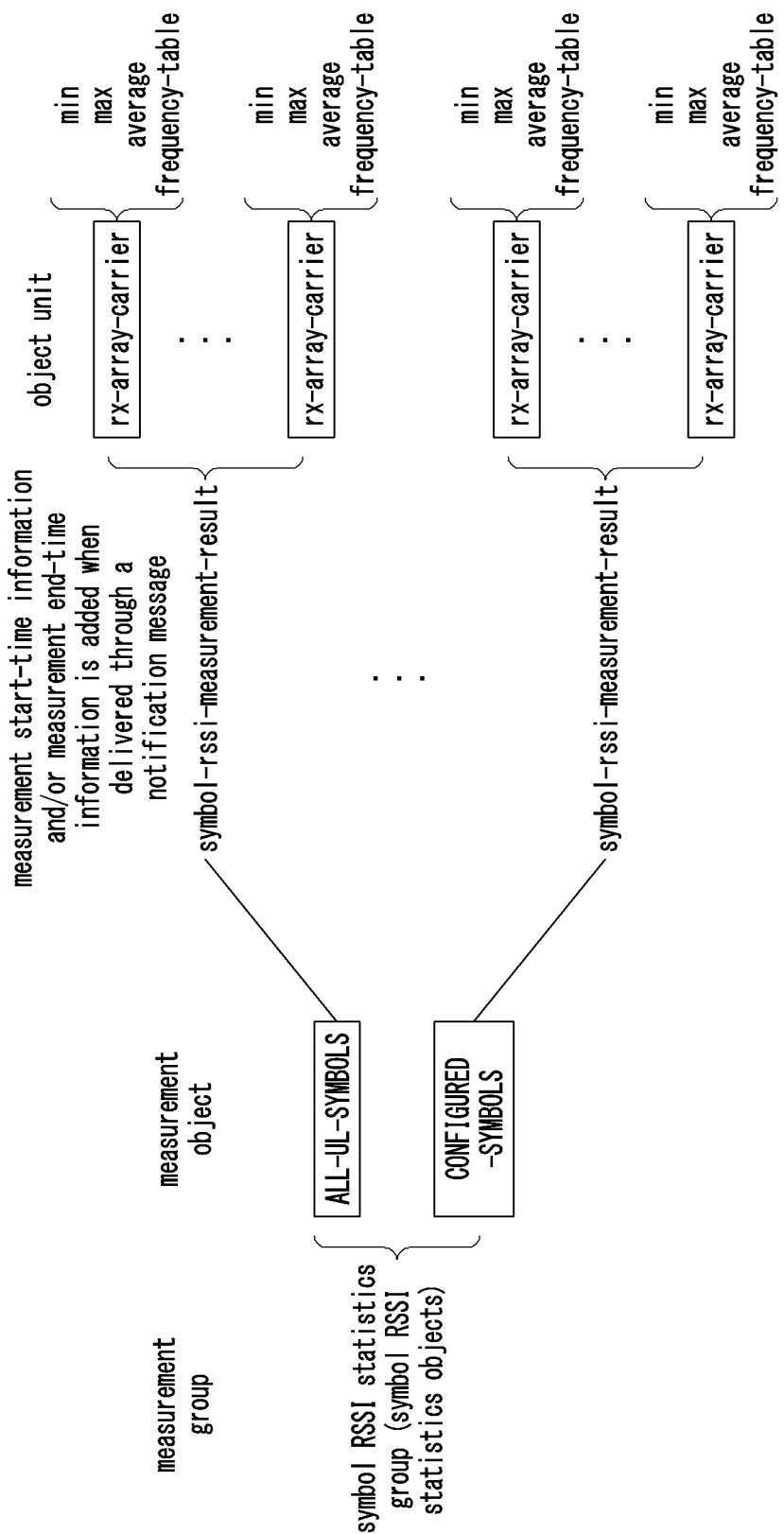
FIG. 9 is a conceptual diagram illustrating a third exemplary embodiment of a data structure of a YANG model for delivery of performance measurement results in the O-RAN M-Plane.

FIG. 9 is a conceptual diagram illustrating a third exemplary embodiment of a data structure of a YANG model for delivery of performance measurement results in the O-RAN M-Plane.

Referring to FIG. 9, measurement group(s) for various measurement results (e.g., measurement information) of symbol RSSI statistics (symbol-rssi-stats) (e.g., RSSI for specific symbols in the time domain) may be newly added. The above-described measurement information may have the same or similar structure to the structure shown in FIG. 7 or FIG. 8. For example, the structure of the symbol RSSI statistics may be the same as or similar to the structure of the transceiver statistics.

The O-RU may perform a measurement operation according to the measurement interval set by the O-DU (e.g., NETCONF client). The O-RU may periodically transmit measurement result(s) to the O-DU using the NETCONF notification mechanism at a time according to the notification interval. Alternatively, the O-RU may store the measurement result(s) in the local disk for each measurement time, and may upload the measurement result(s) to the O-DU at a time according to the file upload interval.

The notification interval may be set differently from the measurement interval. For example, the measurement interval of the measurement object #A may be set to 3 minutes, and the measurement interval of the measurement object #B may be set to 5 minutes. In order to efficiently perform the transmission operation of performance management information, the notification interval may be set to 15 minutes. In this case, in the NETCONF notification transmission procedure, it may be preferable to transmit one notification (e.g., one notification message) including five measurement results for the measurement object #A and three measurement results for the measurement object #B. When the notification interval is set longer than the measurement interval for a specific measurement object, a plurality of measurement results may exist in the O-RU at a time of transmission of the notification. The plurality of measurement results for the specific measurement object may be included in one notification.

The existing YANG model defined in the M-Plane of the O-RAN may not support the transmission/reception operation of one notification including a plurality of measurement results. That is, the existing YANG model may transmit one notification including only one measurement result for each measurement object. Therefore, when the notification interval is set longer than the measurement interval of the measurement object, a notification including only one measurement result may be transmitted, and the remaining measurement result(s) may not be delivered to the (e.g., NETCONF client) in the corresponding notification interval. That is, in the YANG model of the current O-RAN (e.g., YANG model shown in FIGS. 7 and 8), the transmission operation of one notification may be performed to transmit one measurement result for each measurement object. In order to solve the above problems, methods for expanding the YANG model will be proposed below.

A part 1 (e.g., common configuration part) of the YANG model for performance management of the O-RAN M-Plane may be as follows.

[Part 1 of YANG Model]

```
module: o-ran-performance-management
  +--rw performance-measurement-objects
     +--ro measurement-capabilitites
     |  +--ro transceiver-objects* [measurement-object]
     |  |  +--ro measurement-object -> /performance-measurement-
objects/transceiver-measurement-objects/measurement-object
     |  +--ro rx-window-objects* [measurement-object]
     |  |  +--ro measurement-object -> /performance-measurement-
objects/rx-window-measurement-objects/measurement-object
     |  +--ro tx-stats-objects* [measurement-object]
     |  |  +--ro measurement-object -> /performance-measurement-
objects/tx-measurement-objects/measurement-object
     |  +--ro epe-stats-objects* [measurement-object]
     |     +--ro measurement-object -> /performance-measurement-
objects/epe-measurement-objects/measurement-object
     |        +--ro component-class*   identityref
     +--rw enable-SFTP-upload?               boolean
     +--rw enable-random-file-upload?        boolean
     +--rw remote-SFTP-uploads* [remote-SFTP-upload-path]
     |  +--rw remote-SFTP-upload-path    inet:uri
     +--rw transceiver-measurement-interval?   uint16
     +--rw rx-window-measurement-interval?     uint16
     +--rw epe-measurement-interval?           uint16
     +--rw tx-measurement-interval?            uint16
     +--rw notification-interval?              uint16
     +--rw file-upload-interval?               uint16
     +--ro max-bin-count                       uint16
```

The part 1 of the above-described YANG model may define parameters commonly applied to all measurement objects. For example, the part 1 of the YANG model may define information on measurement object(s) supported by the O-RU, configuration of a measurement interval for each measurement group (e.g., transceiver measurement interval, reception window measurement interval, transmission measurement interval, EPE measurement interval, RSSI measurement interval), a notification interval, and/or a file upload interval. The transceiver measurement interval, the reception window measurement interval, the transmission measurement interval, the EPE measurement interval, and the RSSI measurement interval may be set differently. The notification interval or the file upload interval may be set to one common value. Each of the notification interval or the file upload interval may be set differently from the transceiver measurement interval, the reception window measurement interval, the transmission measurement interval, the EPE measurement interval, and/or the RSSI measurement interval.

A part 2 (e.g., transceiver, reception window related notification) of the YANG model for performance management of the O-RAN M-Plane may be as follows.

[Part 2 of YANG Model]

```
notifications:
  +---n measurement-result-stats
     +--ro transceiver-stats* [measurement-object]
     |  +--ro measurement-object -> /performance-
measurement-objects/transceiver-measurement-objects/measure-
ment-object
     |  +--ro start-time?       yang-types:data-and-time
     |  +--ro end-time?         yang-types:data-and-time
     |  +--ro transceiver-measurement-result* [object-unit-id]
     |     +--ro object-unit-id -> /if:interfaces/interface/o-
ran-int:port-reference/port-number
     |     +--ro min
     |     |  +--ro value?       decimal64
     |     |  +--ro time?        yang-types:data-and-time
     |     +--ro max
     |     |  +--ro value?       decimal64
     |     |  +--ro time?        yang-types:data-and-time
     |     +--ro first
     |     |  +--ro value?       decimal64
     |     |  +--ro time?        yang-types:data-and-time
     |     +--ro latest
     |     |  +--ro value?       decimal64
     |     |  +--ro time?        yang-types:data-and-time
     |     +--ro frequency-table*   uint32
     +--ro rx-window-stats* [measurement-object]
        +--ro measurement-object -> /performance-measure-
ment-objects/rx-window-measurement-objects/measurement-object
        +--ro start-time?       yang-types:data-and-time
        +--ro end-time?         yang-types:data-and-time
        + -- ro (object-unit-id)?
           +--:(RU)
           |  +--ro name?   -> /hw:hardware/component/
           |                   name
           |  +--ro count      uint64
           +--:(TRANSPORT)
           |  +--ro tr-measured-result* [ ]
           |     +--ro name?    ->       /o-ran-
elements:processing-elements/ru-elements/name
           |     +--ro count      uint64
           +--:(EAXC_ID)
              +--ro eaxc-measured-result* [ ]
                 +--ro eaxc-id?   uint16
                 +--ro count             uint64
                 +--ro transport-name?   ->    /o-ran-
elements:processing-elemnets/ru-elements/name
```

A part 3 (e.g., EPE, transmission window related notification) of the YANG model for performance management of the O-RAN M-Plane may be as follows.
[Part 3 of YANG Model]

```
+--ro tx-stats* [measurement-object]
| +--ro measurement-object -> /performance-measurement-objects/tx-measurement-objects/measurement-object
| +--ro start-time?                  yang-types:data-and-time
| +--ro end-time?                    yang-types:data-and-time
| +--ro (object-unit-id)?
|        +--:(RU)
|        | +--ro name?     -> /hw:hardware/component/name
|        | +--ro count     uint64
|        +--:(TRANSPORT)
|        | +--ro tr-measured-result* [ ]
|        |         +--ro name?            -> /o-ran-elements:processing-elements/ru-elements/name
|        |         +--ro count            uint64
|        +--:(EAXC_ID)
|                 +--ro eaxc-measured-result* [ ]
|                         +--ro eaxc-id?  uint16
|                         +--ro count     uint64
|                         +--ro transport-name? -> /o-ran-elements:processing-elemnets/ru-elements/name
   x--ro epe-stats
| +--ro start-time?                  yang-types:data-and-time
| +--ro end-time?                    yang-types:data-and-time
| +--ro epe-measurement-result*      [object-unit-id]
|        +--ro object-unit-id        -> /hw:hardware/component/class
|        +--ro min?                  decimal64
|        +--ro max?                  decimal64
|        +--ro average?              decimal64
+--ro epe-statistics*                [measurement-object]
        +--ro measurement-object -> /performance-measurement-objects/epe-measurement-objects/measurement-object
        +--ro start-time?            yang-types:data-and-time
        +--ro end-time?              yang-types:data-and-time
        +--ro epe-measurement-result* [object-unit-id]
                +--ro object-unit-id    -> hw:hardware/component/class
                +--ro min?              decimal64
                +--ro max?              decimal64
                +--ro average?          decimal64
```

The parts 2 and 3 of the YANG model may be a YANG model defined for transmitting measurement information related to the transceiver, reception window, EPE, and/or transmission window in form of a NETCONF notification. Each of the transceiver statistics, reception window statistics, transmission statistics, EPE statistics, and RSSI statistics may include one result (e.g., value) measured for one measurement object in a measurement period from a start time to an end time.

That is, results measured in a plurality of time periods (e.g., a plurality of measurement periods) may not be transmitted using one notification. In particular, when the measurement intervals for the transceiver, reception window, EPE, transmission window, and RSSI are set differently, the notification including the measurement results need to be transmitted frequently. A YANG model to solve the above-described problem may be configured as follows.
[Method A]

When [Method A] is used, an additional measurement list including one or more measurement results may be configured for each measurement object, and the additional measurement list may be added to statistical information of the corresponding measurement object. For example, the additional measurement list may be added to the statistical information in chronological order.

Figure 10:
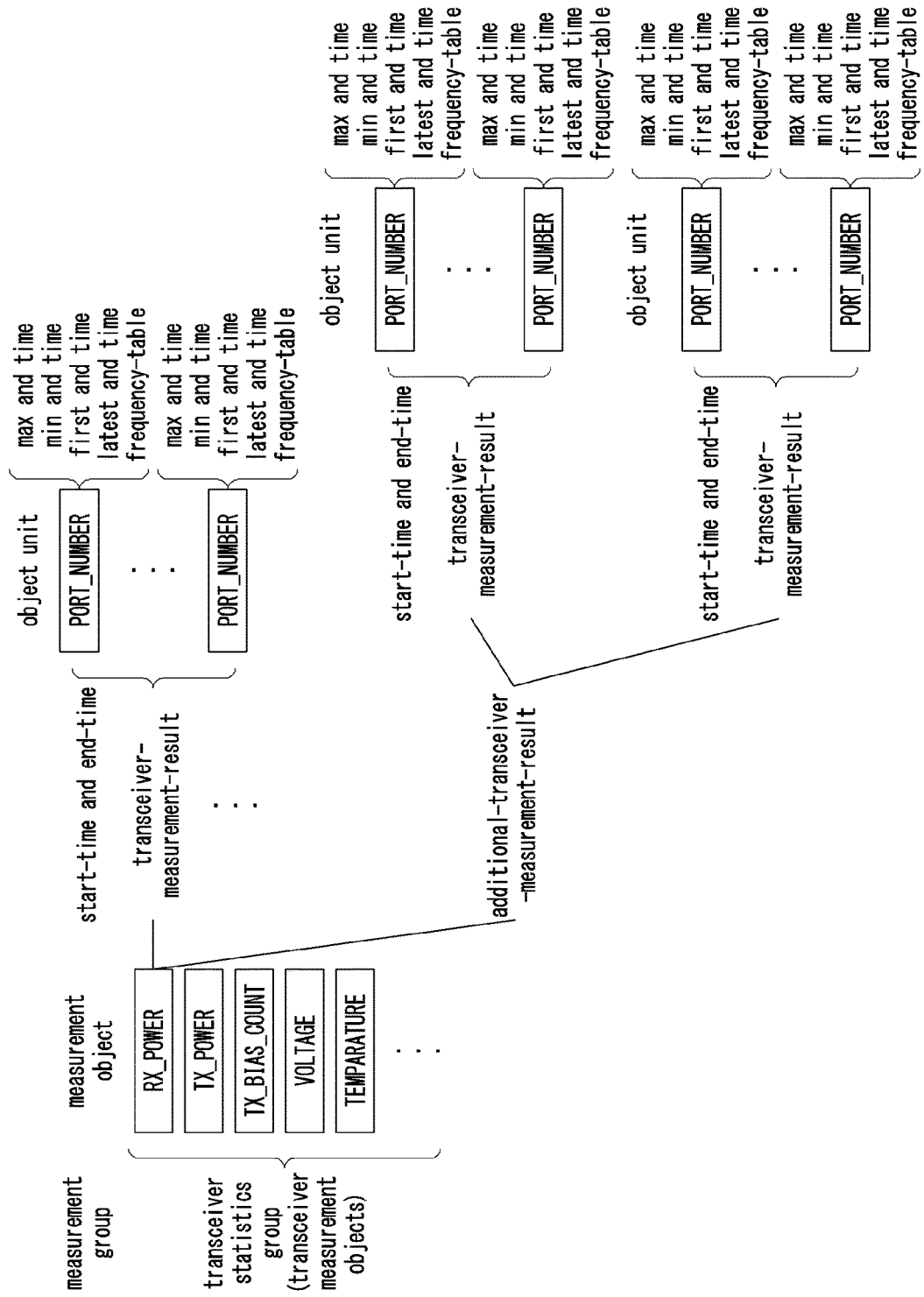
FIG. 10 is a conceptual diagram illustrating a first exemplary embodiment of a structure of an extended measurement result for a transceiver in a YANG model using Method A.

FIG. 10 is a conceptual diagram illustrating a first exemplary embodiment of a structure of an extended measurement result for a transceiver in a YANG model using Method A.

Referring to FIG. 10, an additional transceiver measurement result (i.e., additional-transceiver-measurement-result) may be added for each measurement object (e.g., RX_POWER, TX_POWER, TX BIAS COUNT, TEMPERATURE, etc.).

Figure 11:
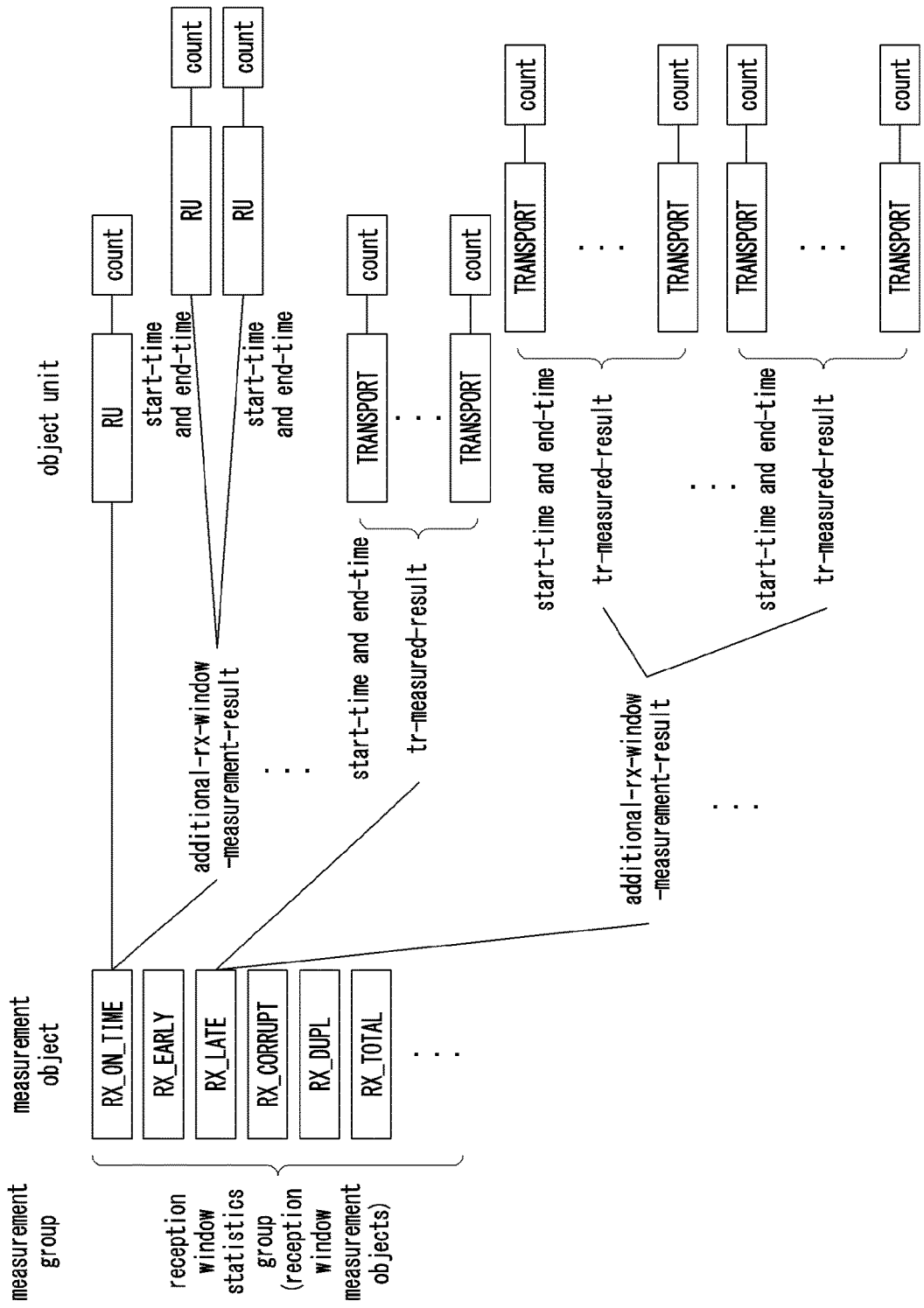
FIG. 11 is a conceptual diagram illustrating a first exemplary embodiment of a structure of an extended measurement result for a reception window in a YANG model using Method A.

FIG. 11 is a conceptual diagram illustrating a first exemplary embodiment of a structure of an extended measurement result for a reception window in a YANG model using Method A.

Referring to FIG. 11, an additional reception window measurement result (i.e., additional-rx-window-measurement-result) may be added for each measurement object (e.g., RX_ON_TIME, RX_EARLY, RX_LATE, RX_CORRUT, RX_DUPL, RX_TOTAL, etc.).

Figure 12:
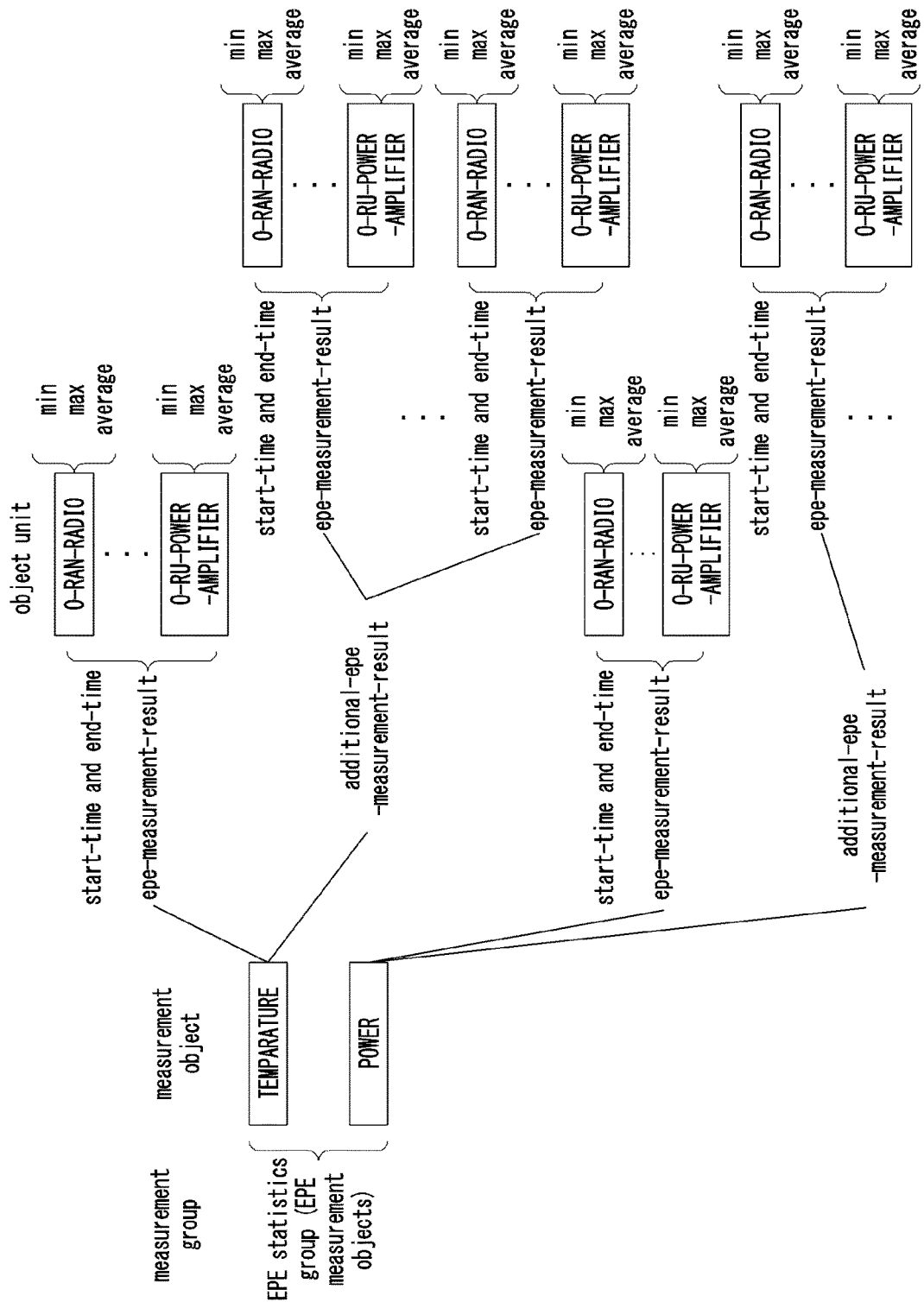
FIG. 12 is a conceptual diagram illustrating a first exemplary embodiment of a structure of an extended measurement result for EPE in a YANG model using Method A.

FIG. 12 is a conceptual diagram illustrating a first exemplary embodiment of a structure of an extended measurement result for EPE in a YANG model using Method A.

Referring to FIG. 12, an additional EPE measurement result (i.e., additional-epe-measurement-result) may be added for each measurement object (e.g., TEMPERATURE, POWER).

Figure 13:
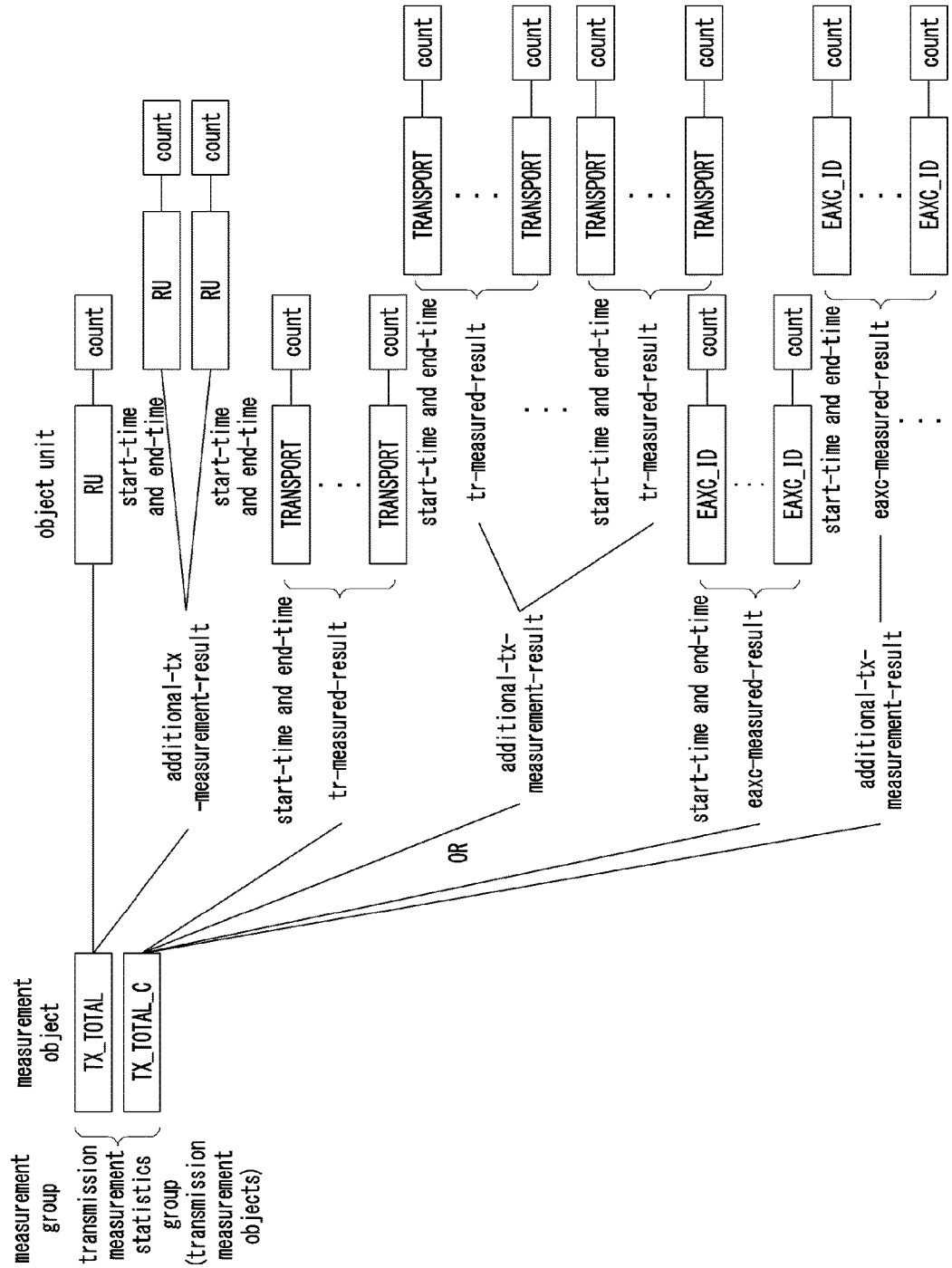
FIG. 13 is a conceptual diagram illustrating a first exemplary embodiment of a structure of an extended measurement result for transmission measurement in a YANG model using Method A.

FIG. 13 is a conceptual diagram illustrating a first exemplary embodiment of a structure of an extended measurement result for transmission measurement in a YANG model using Method A.

Referring to FIG. 13, an additional transmission measurement result (i.e., additional-tx-measurement-result) may be added for each measurement object (e.g., TX_TOTAL, TX_TOTAL C).

Figure 14:
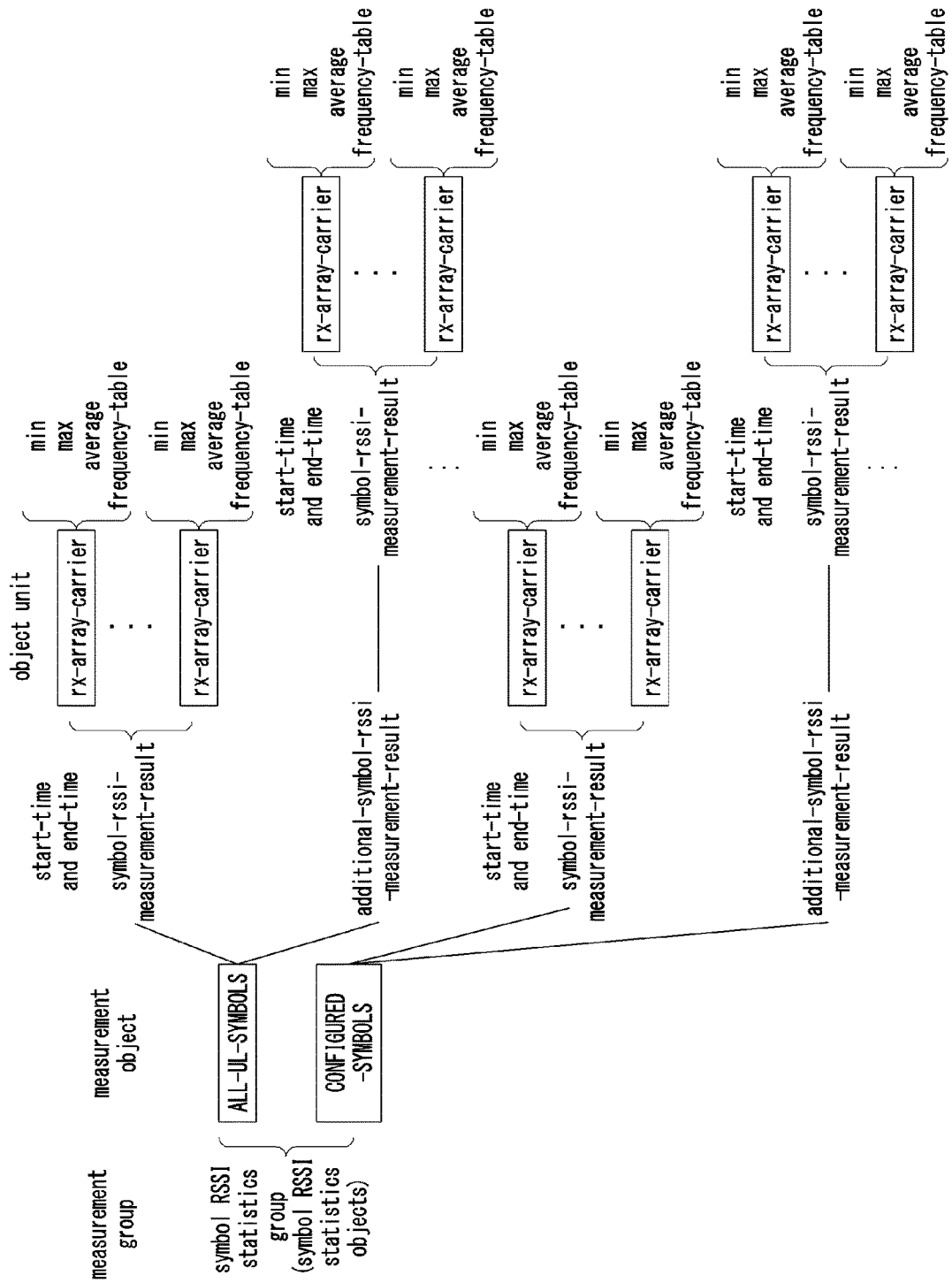
FIG. 14 is a conceptual diagram illustrating a first exemplary embodiment of a structure of an extended measurement result for a symbol RSSI in a YANG model using Method A.

FIG. 14 is a conceptual diagram illustrating a first exemplary embodiment of a structure of an extended measurement result for a symbol RSSI in a YANG model using Method A.

Referring to FIG. 14, an additional symbol RSSI measurement result (i.e., additional-symbol-rssi-measurement-result) may be added for each measurement object (e.g., ALL-UL-SYMBOLS, CONFIGURED-SYMBOLS).

The structure of the YANG model according to Method 1 described above may be defined as follows.

<Method 1>

```
module: o-ran-performance-management
    ... (omitted) ...
    notifications:
        +---n measurement-result-stats
            +--ro transceiver-stats* [measurement-object]
            |      +--ro measurement-object                          ->
/performance-measurement-objects/transceiver-measurement-objects/measurement-
object
            |      +--ro start-time?                        yang-types:date-and-time
            |      +--ro end-time?                          yang-types:date-and-time
            |      +--ro transceiver-measurement-result* [object-unit-id]
            |      |    +--ro object-unit-id        -> /if:interfaces/interface/o-ran-int:port-
reference/port-number
            |      |    +--ro min
            |      |    |   +--ro value?            decimal64
            |      |    |   +--ro time?             yang-types:date-and-time
            |      |    +--ro max
            |      |    |   +--ro value?            decimal64
            |      |    |   +--ro time?             yang-types:date-and-time
            |      |    +--ro first
            |      |    |   +--ro value?            decimal64
            |      |    |   +--ro time?             yang-types:date-and-time
            |      |    +--ro latest
            |      |    |   +--ro value?            decimal64
            |      |    |   +--ro time?             yang-types:date-and-time
            |      |    +--ro frequeny-table*       uint32
            |      +--ro number-of-additional-measurement-result?    unit8
            |      +--ro additional-transceiver-measurement-result* [seq-number]
            |           +--ro seq-number                   uint8
            |           +--ro start-time?                  yang-types:date-and-time
            |           +--ro end-time?                    yang-types:date-and-time
            |           +--ro transceiver-measurement-result* [object-unit-id]
            |                +--ro object-unit-id        -> /if:interraces/interface/o-ran-
int:port-reference/port-number
            |                +--ro min
            |                |   +--ro value?           decimal64
            |                |   +--ro time?            yang-types:date-and-time
            |                +--ro max
            |                |   +--ro value?           decimal64
            |                |   +--ro time?            yang-types:date-and-time
            |                +--ro first
            |                |   +--ro value?           decimal64
            |                |   +--ro time?            yang-types:date-and-time
            |                +--ro latest
            |                |   +--ro value?           decimal64
            |                |   +--ro time?            yang-types:date-and-time
            |                +--ro frequeny-table*      uint32
            +--ro rx-window-stats* [measurement-object]
            |      +--ro measurement-object                          ->
/performance-measurement-objects/rx-window-measurement-objects/measurement-
object
            |      +--ro start-time?                        yang-types:date-and-time
            |      +--ro end-time?                          yang-types:date-and-time
            |      +--ro (object-unit-id)?
            |      |    +--:(RU)
            |      |    |   +--ro name?              -> /hw:hardware/component/name
            |      |    |   +--ro count              uint64
            |      |    +--:(TRANSPORT)
            |      |    |   +--ro tr-measured-result* [ ]
            |      |    |       +--ro name? -> /o-ran-elements:processing-elements/ru-
elements/name
            |      |    |       +--ro count          uint64
            |      |    + --:(EAXC__ID)
            |      |        +--ro eaxc-measured-result* [ ]
            |      |             +--ro eaxc-id?       uint16
            |      |             +--ro count          uint64
```

```
          |                      |            +--ro data-direction?      Enumeration
          |                      |            +--ro transport-name?      -> /o-ran-elements:processing-
elements/ru-elements/name
          |                      +--ro number-of-additional-measurement-result?    uint8
          |                      +--ro additional-rx-window-measurement-result* [seq-number]
          |                         +--ro seq-number              uint8
          |                         +--ro start-time?             yang-types:date-and-time
          |                         +--ro end-time?               yang-types:date-and-time
          |                         +--ro (object-unit-id)?
          |                            +--:(RU)
          |                            |   +--ro name?       -> /hw:hardware/component/name
          |                            |   +--ro count       uint64
          |                            +--:(TRANSPORT)
          |                            |   +--ro tr-measured-result* [ ]
          |                            |      +--ro name?        -> /o-ran-elements:processing-
elements/ru-elements/name
          |                            |      +--ro count        uint64
          |                            +--:(EAXC_ID)
          |                               +--ro eaxc-measured-result* [ ]
          |                                  +--ro eaxc-id?           uint16
          |                                  +--ro count              uint64
          |                                  +--ro data-direction?    Enumeration
          |                                  +--ro transport-name? -> /o-ran-elements:processing-
elements/ru-elements/name
          +--ro tx-stats* [measurement-object]
          |              +--ro measurement-object                              ->
/performance-measurement-objects/tx-measurement-objects/measurement-object
          |              +--ro start-time?                yang-types:date-and-time
          |              +--ro end-time?                  yang-types:date-and-time
          |              +--ro (object-unit-id)?
          |              |  +--:(RU)
          |              |  |  +--ro name?         -> /hw:hardware/component/name
          |              |  |  +--ro count                        uint64
          |              |  +--:(TRANSPORT)
          |              |  |  +--ro tr-measured-result* [ ]
          |              |  |     +--ro name? -> /o-ran-elements:processing-elements/ru-
elements/name
          |              |  |     +--ro count    uint64
          |              |  +--:(EAXC_ID)
          |              |     +--ro eaxc-measured-result* [ ]
          |              |        +--ro eaxc-id?           uint16
          |              |        +--ro count              uint64
          |              |        +--ro transport-name?    -> /o-ran-elements:processing-
elements/ru-elements/name
          |              +--ro number-of-additional-measurement-result?   uint8
          |              +--ro additional-tx-measurement-result* [seq-number]
          |                 +--ro seq-number            uint8
          |                 +--ro start-time?           yang-types:date-and-time
          |                 +--ro end-time?             yang-types:date-and-time
          |                 +--ro (object-unit-id)?:
          |                    +--:(RU)
          |                    |   +--ro name?                          ->
/hw:hardware/component/name
          |                    |   +--ro count            uint64
          |                    +--:(TRANSPORT)
          |                    |   +--ro tr-measured-result* [ ]
          |                    |      +--ro name?        -> /o-ran-elements:processing-
elements/ru-elements/name
          |                    |      +--ro count    uint64
          |                    +--:(EAXC_ID)
          |                       +--ro eaxc-measured-result* [ ]
          |                          +--ro eaxc-id?           uint16
          |                          +--ro count              uint64
          |                          +--ro transport-name? - > /o-ran-elements:processing-
elements/ru-elements/name
          x--ro epe-stats
          |              +--ro start-time?            yang-types:date-and-time
          |              +--ro end-time?              yang-types:date-and-time
          |              +--ro epe-measurement-result* [object-unit-id]
          |                 +--ro object-unit-id    -> /hw:hardware/component/class
          |                 +--ro min?              decimal64
          |                 +--ro max?              decimal64
          |                 +--ro average?          decimal64
          +--ro epe-statistics* [measurement-object]
                         +--ro measurement-object                              ->
/performance-measurement-objects/epe-measurement-objects/measurement-object
                         +--ro start-time?            yang-types:date-and-time
                         +--ro end-time?              yang-types:date-and-time
                         +--ro epe-measurement-result* [object-unit-id]
```

-continued

```
            |    +--ro object-unit-id        -> /hw:hardware/component/class
            |    +--ro min?                  decimal64
            |    +--ro max?                  decimal64
            |    +--ro average?              decimal64
            +--ro number-of-additional-measurement-result?      unit8
            +--ro additional-epe-measurement-result* [seq-number]
                  +--ro seq-number                  uint8
                  +--ro start-time?                 yang-types:date-and-time
                  +--ro end-time?                   yang-types:date-and-time
                  +-- ro epe-measurement-result* [object-unit-id]
                        +--ro          object-unit-id          ->
/hw:hardware/component/class
                        +--ro min?                  decimal64
                        +--ro max?                  decimal64
                        +--ro average?              decimal64
```

The modified YANG code may be as follows.

```
    grouping measurement-notification {
       description
         "notification may contain measurement result for transceiver-stats
            and/or rx-window-stats and/or tx-stats and/or epe-stats";
       list transceiver-stats {
         key "measurement-object";
         description
            "measurement result of transceiver-measurement per measurement-
object";
         leaf measurement-object {
            type leafref {
               path         "/performance-measurement-objects/transceiver-
measurement-objects/measurement-object";
            }
            description
               "measurement-object for the transceiver-measurement";
         }
         uses start-and-end-time; // start-and-end-time of the first result
         uses transceiver-measurement-result-grouping; // First result
         // For additional measurement result
         leaf number-of-additional-measurement-result {
            type uint8;
            config false;
            description
               "This parameter indicates the number of additional
measurement result.";
         }
         list additional-transceiver-measurement-result {
            // when measurement-interval < notification interval
            config false;
            description
               "measurement result of additional transceiver-measurement";
            key seq-number;
            leaf seq-number {
               type uint8 {
                    range "1..max";
               }
            }
            uses start-and-end-time;
            uses transceiver-measurement-result-grouping;
         }
       }
       list rx-window-stats {
         key "measurement-object";
         description
            "measurement result for the reception window measurement per
               measurement-object";
         leaf measurement-object {
            type leafref {
               path       "/performance-measurement-objects/rx-window-
measurement-objects/measurement-object";
            }
            description
               "measurement-object for the reception window measurement";
         }
         uses start-and-end-time;
         uses rx-window-measurement-result-grouping;
         // For additional measurement result
```

```
        leaf number-of-additional-measurement-result {
            type uint8;
            config false;
            description
                "This parameter indicates the number of additional measurement
result.";
        }
        list additional-rx-window-measurement-result {
            // when measurement-interval < notification interval
            config false;
            description
                "measurement result of additional rx-window-measurement";
            key seq-number;
            leaf seq-number {
                type uint8 {
                    range "1..max";
                }
            }
            uses start-and-end-time;
            uses rx-window-measurement-result-grouping;
        }
    }
    list tx-stats {
        key "measurement-object";
        description
            "measurement result for the tx stats measurement per
                measurement-object";
        leaf measurement-object {
            type leafref {
                path        "/performance-measurement-objects/tx-measurement-
objects/measurement-object";
            }
            description
                "measurement-object for the tx stats measurement";
        }
        uses start-and-end-time;
        uses tx-measurement-result-grouping;
        // For additional measurement result
        leaf number-of-additional-measurement-result {
            type uint8;
            config false;
            description
                "This parameter indicates the number of additional measurement
result.";
        }
        list additional-tx-measurement-result {
            // when measurement-interval < notification interval
            config false;
            description
                "measurement result of additional tx-measurement";
            key seq-number;
            leaf seq-number {
             type uint8 {
                 range "1..max";
             }
            }
            uses start-and-end-time;
            uses tx-measurement-result-grouping;
        }
    }
    container epe-stats{
        description
            "container for the epe stats measurement - deprecated because
measurement object isn't included";
        status deprecated;
        uses start-and-end-time;
        uses epe-measurement-result-grouping;
    }
    list epe-statistics {
        key "measurement-object";
        description
            "measurement result for the epe stats measurement per
                measurement-object";
        leaf measurement-object {
            type leafref {
                path        "/performance-measurement-objects/epe-measurement-
objects/measurement-object";
            }
            description
```

```
            "measurement-object for the epe stats measurement";
        }
        uses start-and-end-time;
        uses epe-measurement-result-grouping;
        // For additional measurement result
        leaf number-of-additional-measurement-result {
            type uint8;
            config false;
            description
                "This parameter indicates the number of additional
measurement result.";
        }
        list additional-epe-measurement-result {
            // when measurement-interval < notification interval
            config false;
            description
                "measurement result of additional epe-measurement";
            key seq-number;
            leaf seq-number {
                type uint8 {
                    range "1..max";
                }
            }
            uses start-and-end-time;
            uses epe-measurement-result-grouping;
        }
    }
}
```

When the notification interval of the measurement object is longer than the measurement interval, a plurality of measurement results of each of the measurement objects may be included in one notification (e.g., one notification message). In order to support this operation, the YANG model may be expanded, so that each measurement object belonging to the transceiver statistics group, the reception window statistics group, the transmission statistics group, and the EPE statistics group includes an additional measurement result list or the entire measurement results (e.g., list additional-transceiver-measurement-result, list additional-rx-window-measurement-result, list additional-tx-measurement-result, list additional-epe-measurement-result, etc.).

The additional measurement result list may include a start time (e.g., measurement start time), an end time (e.g., measurement end time), and measurement results in the corresponding time period (e.g., measurement values in the measurement period). The measurement period may be a time period from the start time to the end time.

In the existing YANG model, one notification including only one measurement result per measurement object may be transmitted. When the measurement result is changed to the measurement result list, fronthaul equipments (e.g., O-DU and/or O-RU) supporting the existing YANG model may not be able to decode the measurement result list. That is, a problem of backward compatibility with the existing fronthaul equipments may occur. The YANG model proposed in the present disclosure may use the start time, end time, and measurement results of the existing YANG model as they are. The measurement result of the existing YANG model may include the first measurement result. The proposed YANG model may include an additional measurement result list compared to the existing YANG model. The additional measurement result list may include one or more measurement results from the second measurement result. The measurement results may be arranged in chronological order (e.g., in ascending order of measurement time) in the additional measurement result list. This operation may be referred to as 'Method a'. According to Method a, since the measurement-related parameters used in the existing YANG model are used as they are, a backward compatibility problem may not occur.

That is, the existing O-DU that can decode only one measurement result in one notification may be able to decode the existing parameter(s) (e.g., transceiver-stats, rx-window-stats, tx-stats, epe-stats). In this case, even when the O-RU transmits one notification including a plurality of measurement results, the existing O-DU may successfully receive one measurement result.

Alternatively, the O-RU may configure the last measurement result (e.g., the most recent measurement result) among the plurality of measurement results as the existing measurement result parameter, and may generate an additional measurement result list (e.g., additional-measurement-result) including from the first measurement result to the measurement result just before the last measurement result. This operation may be referred to as 'Method b'. According to Method b, one measurement result that the existing O-DU can receive may be the most recent measurement result.

In order to improve the decoding convenience of the O-DU in the notification reception procedure, the O-RU may inform the number of measurement results included in the additional measurement result list (e.g., number-of-additional-measurement-result) to the O-DU. That is, the additional measurement result list may further include number-of-additional-measurement-result. In addition, the additional measurement result list may further include sequence numbers (e.g., seq-number). When Method a is used, the sequence numbers for the measurement results in the measurement result list may start from 1 and may increase in chronological order. In this case, the sequence number of the existing measurement result (e.g., the first measurement result) may be regarded as 0. When Method b is used, the sequence numbers for the measurement results in the measurement result list may start from 0 and may increase in chronological order. In this case, the existing measurement result may be regarded as the last measurement result. The O-DU may easily arrange the measurement results in chronological order by using the sequence numbers as key values of the additional measurement result list. In addition, the O-DU may easily find a specific measurement result using a sequence number.

Sequence numbers may not be included in the additional measurement result list, and a start time and an end time instead of the sequence numbers may be used as key values of the additional measurement result list. The key of the additional measurement result list may not be specified. If the key of the additional measurement result list is not specified, the O-DU cannot directly access a specific entry (e.g., specific measurement result) in the additional measurement result list, and should always decode the entire additional measurement result list. In order to reduce the number of parameters, number-of-additional-measurement-result may not be used. In the NETCONF/YANG model, even if the number of entries (e.g., measurement results) included in the additional measurement result list is not explicitly indicated, a recipient (e.g., O-DU) may know the number of entries. number-of-additional-measurement-result may be used to improve decoding convenience of the recipient. In order to arrange the entries of the additional measurement result list in chronological order without arbitrarily defining the order of the entries of the additional measurement result list by the communication system, a sequence number, which is a key value, may be defined as 'ordered—by user'.

Alternatively, when the O-RU transmits the measurement result to the existing (e.g., O-DU that supports a previous version of O-RAN M-Plane 7.0 version, that cannot decode the additional measurement result list), the O-RU may transmit leafs (e.g., start-time, end-time, and X XXX-measurement-result[ ]) capable of transmitting one measurement result. In addition, the O-RU may transmit an additional measurement result list including all of the plurality of measurement results to the O-DU capable of processing the additional measurement result list (e.g., O-DU supporting O-RAN M-Plane 7.0 version, O-DU supporting O-RAN M-Plane version 7.0 or later). This operation may be referred to as 'Method c'. In an exemplary embodiment, the O-DU capable of processing the additional measurement result list may be referred to as 'new O-DU', the O-DU that cannot process the additional measurement result list may be referred to as 'existing O-DU', and the O-DU may mean the new O-DU and/or the existing O-DU.

The above-described YANG model may be used in Method c as it is. However, when transmitting a notification to the existing O-DU, transmission of the additional measurement result list (e.g., additional-measurement-result[ ]) may be omitted, and only the existing leafs may be used. When a notification is transmitted to a new O-DU, transmission of leafs capable of transmitting one measurement result may be omitted, and the O-RU may transmit an additional measurement result list including a plurality of measurement results (e.g., additional-measurement-result[ ]) to the new O-DU. In the additional measurement result list, all measurement results (e.g., measurement results from the first measurement result to the last measurement result) may be arranged in chronological order.

The O-RU may transmit a notification including one measurement result for each measurement object to the existing O-DU. In this case, the existing O-DU may set the measurement interval and the notification interval of the O-RU to be the same so that one measurement result occurs in one notification interval. Alternatively, when the existing O-DU sets the notification interval to be longer than the measurement interval, the O-RU may transmit only the most recent measurement result among the measurement results to the existing O-DU. Detailed methods of the above-described operation are described in <Method for ensuring backward compatibility and interoperability with equipment that does not support a multi-measurement result reporting function>.

When the above-described method is used, in order to improve the decoding convenience of the O-DU in the notification reception procedure, the O-RU may inform the number of measurement results included in the additional measurement result list (e.g., number-of-additional-measurement-result) to the O-DU. The measurement result list may include sequence numbers (seq-number). The sequence numbers for the measurement results in the measurement result list may start from 0 and may increase in chronological order. The O-DU may easily arrange the measurement results in chronological order by using the sequence numbers as key values of the additional measurement result list. In addition, the O-DU may easily find a specific measurement result using a sequence number.

Alternatively, the O-RU may transmit one notification including a plurality of measurement results. In this case, the O-RU may generate a plurality of additional measurement result lists based on the plurality of measurement results, and may transmit a notification including the plurality of additional measurement result lists to the O-DU. On the other hand, an O-RU that does not support the above-described operation may transmit one measurement result to the O-DU by using leafs supporting transmission of one measurement result. The existing O-DU cannot decode the additional measurement result list, but may ignore the new additional leafs (e.g., the additional measurement result list). Therefore, an error may not occur in the existing O-DU.

Alternatively, in the transmission procedure of the measurement result, as in Method a and/or Method b, the O-RU may transmit, to the O-DU, a notification including leafs including one measurement result (e.g., one measurement result per measurement object, the most recent measurement result) and an additional measurement result list including a plurality of measurement results. All of the plurality of measurement values may be included in the additional measurement result list. This operation may be referred to as 'Method d'. In this case, one measurement result (e.g., the most recent measurement result) may be included in both the existing leafs and the additional measurement result list. When Method d is used, one measurement result is transmitted redundantly, but the O-RU may not need to distinguish the type of the O-DU (e.g., existing O-DU or new O-DU). In addition, without a separate control parameter (e.g., enable-multiple-stats-in-notification), the may transmit a common notification that both the existing O-DU and the new can decode. That is, implementation complexity of the O-RU may be reduced.

Since the existing O-DU can decode leafs including one measurement result, one measurement result can be obtained from the notification received from the O-RU. The new O-DU may decode the additional measurement result list including the plurality of measurement results, and may perform a processing operation based on the plurality of measurement results.

When one measurement result occurs for each measurement object in the notification interval, the O-RU may transmit leafs including one measurement result. In this case, redundant information may be reduced. Alternatively, the O-RU may generate leafs including one measurement result and an additional measurement result list including one measurement result, and transmit the leafs including one measurement result and the additional measurement result list to the O-DU. That is, the same measurement result may be included in the leafs including one measurement result and the additional measurement result list. In this case, overhead due to transmission of the redundant information may increase, but the new O-DU may always decode the additional measurement result list instead of the existing leafs regardless of the number of measurement results. In this case, the implementation complexity of the O-DU may be reduced.

The new O-DU may support all functions of the existing O-DU. Therefore, even when the existing leafs including one measurement result are received, the new may always decode the existing leafs. On the other hand, the existing O-DU may not be able to decode the additional measurement result list. The existing O-DU may ignore the additional measurement result list (e.g., new leafs). Therefore, an error may not occur in the existing O-DU. The existing O-DU may receive the existing leafs including one measurement result and may decode the existing leafs. In Method d, the existing O-DU may always perform reception and decoding operations for one measurement result (e.g., the most recent measurement result). Therefore, the existing O-DU may operate in the existing scheme. According to the above-described scheme, the backward compatibility problem may be solved. Detailed methods of the above-described operation will be described in <Method for ensuring backward compatibility and interoperability with equipment that does not support a multi-measurement result reporting function>.

When the above-described method is used, in order to improve the decoding convenience of the O-DU in the notification reception procedure, the O-RU may inform the number of measurement results included in the additional measurement result list (e.g., number-of-additional-measurement-result) to the O-DU. The measurement result list may include sequence numbers (seq-number). The sequence numbers for the measurement results in the measurement result list may start from 0 and may increase in chronological order. The O-DU may easily arrange the measurement results in chronological order by using the sequence numbers as key values of the additional measurement result list. In addition, the O-DU may easily find a specific measurement result using a sequence number.

<Method 2>

In Method 2, number-of-additional-measurement-result and seq-number may not be used, and a start-time and an end-time may be used as keys of the additional measurement result list (e.g., additional-measurement list). Measurement results for each measurement object may be arranged in the additional measurement result list (e.g., additional-xxxx-measurement-list [ ]) in chronological order.

A structure of the YANG model according to Method 2 described above may be defined as follows.

```
module: o-ran-performance-management
  ... (omitted) ...
  notifications:
    +---n measurement-result-stats
       +--ro transceiver-stats* [measurement-object]
       |  +--ro measurement-object ->
/performance-measurement-objects/transceiver-measurement-objects/measurement-object
       |  +--ro start-time?                      yang-types:date-and-time
       |  +--ro end-time?                        yang-types:date-and-time
       |  +--ro transceiver-measurement-result* [object-unit-id]
       |  |  +--ro object-unit-id          -> /if:interfaces/interface/o-ran-int:port-reference/port-number
       |  |  +--ro min
       |  |  |  +--ro value?               decimal64
       |  |  |  +--ro time?                yang-types:date-and-time
       |  |  +--ro max
       |  |  |  +--ro value?               decimal64
       |  |  |  +--ro time?                yang-types:date-and-time
       |  |  +--ro first
       |  |  |  +--ro value?               decimal64
       |  |  |  +--ro time?                yang-types:date-and-time
       |  |  +--ro latest
       |  |  |  +--ro value?               decimal64
       |  |  |  +--ro time?                yang-types:date-and-time
       |  |  +--ro frequeny-table*         uint32
       |  +--ro additional-transceiver-measurement-result* [start-time end-time]
       |     +--ro start-time                   yang-types:date-and-time
       |     +--ro end-time                     yang-types:date-and-time
       |     +--ro transceiver-measurement-result* [object-unit-id]
       |        +--ro object-unit-id       -> /if:interfaces/interface/o-ran-int:port-reference/port-number
       |        +--ro min
       |        |  +--ro value?            decimal64
       |        |  +--ro time?             yang-types:date-and-time
       |        +--ro max
       |        |  +--ro value?            decimal64
       |        |  +--ro time?             yang-types:date-and-time
       |        +--ro first
       |        |  +--ro value?            decimal64
       |        |  +--ro time?             yang-types:date-and-time
       |        +--ro latest
       |        |  +--ro value?            decimal64
       |        |  +--ro time?             yang-types:date-and-time
       |        +--ro frequeny-table*      uint32
```

```
        +--ro rx-window-stats* [measurement-object]
        |   +--ro measurement-object ->
/performance-measurement-objects/rx-window-measurement-objects/measurement-
object
        |       +--ro start-time?              yang-types:date-and-time
        |       +--ro end-time?                yang-types:date-and-time
        |       +--ro (object-unit-id)?
        |       |  +--:(RU)
        |       |  |  +--ro name?              -> /hw:hardware/component/name
        |       |  |  +--ro count              uint64
        |       |  +--:(TRANSPORT)
        |       |  |  +--ro tr-measured-result* [ ]
        |       |  |     +--ro name?    -> /o-ran-elements:processing-elements/ru-
elements/name
        |       |  |     +--ro count           uint64
        |       |  +--:(EAXC_ID)
        |       |     +--ro eaxc-measured-result* [ ]
        |       |        +--ro eaxc-id?             uint16
        |       |        +--ro count                uint64
        |       |        +--ro data-direction?      Enumeration
        |       |        +--ro transport-name? -> /o-ran-elements:processing-
elements/ru-elements/name
        |       +--ro additional-rx-window-measurement-result* [start-time end-
time]
        |          +--ro start-time             yang-types:date-and-time
        |          +--ro end-time               yang-types:date-and-time
        |          +--ro (object-unit-id)?
        |          |  +--:(RU)
        |          |  |  +--ro name?            -> /hw:hardware/component/name
        |          |  |  +--ro count            uint64
        |          |  +--:(TRANSPORT)
        |          |  |  +--ro tr-measured-result* [ ]
        |          |  |     +--ro name?    -> /o-ran-elements:processing-
elements/ru-elements/name
        |          |  |     +--ro count         uint64
        |          |  +--:(EAXC_ID)
        |          |     +--ro eaxc-measured-result* [ ]
        |          |        +--ro eaxc-id?            uint16
        |          |        +--ro count               uint64
        |          |        +--ro data-direction?     Enumeration
        |          |        +--ro transport-name? -> /o-ran-elements:processing-
elements/ru-elements/name
        +--ro tx-stats* [measurement-object]
        |   +--ro measurement-object            -> /performance-
measurement-objects/tx-measurement-objects/measurement-object
        |       +--ro start-time?              yang-types:date-and-time
        |       +--ro end-time?                yang-types:date-and-time
        |       +--ro (object-unit-id)?
        |       |  +--:(RU)
        |       |  |  +--ro name?              -> /hw:hardware/component/name
        |       |  |  +--ro count              uint64
        |       |  +--:(TRANSPORT)
        |       |  |  +--ro tr-measured-result* [ ]
        |       |  |     +--ro name?    -> /o-ran-elements:processing-elements/ru-
elements/name
        |       |  |     +--ro count           uint64
        |       |  +--:(EAXC_ID)
        |       |     +--ro eaxc-measured-result* [ ]
        |       |        +--ro eaxc-id?             uint16
        |       |        +--ro count                uint64
        |       |        +--ro transport-name? -> /o-ran-elements:processing-
elements/ru-elements/name
        |       +--ro additional-tx-measurement-result* [start-time end-time]
        |          +--ro start-time             yang-types:date-and-time
        |          +--ro end-time               yang-types:date-and-time
        |          +--ro (object-unit-id)?
        |             +--:(RU)
        |             |  +--ro name? ->
/hw:hardware/component/name
        |             |  +--ro count            uint64
        |             +--:(TRANSPORT)
        |             |  +--ro tr-measured-result* [ ]
        |             |     +--ro name?    -> /o-ran-elements:processing-
elements/ru-elements/name
        |             |     +--ro count         uint64
        |             +--:(EAXC_ID)
        |                +--ro eaxc-measured-result* [ ]
```

```
             |            +--ro eaxc-id?                      uint16
             |            +--ro count                         uint64
             |            +--ro transport-name ?-> /o-ran-elements:processing-
elements/ru-elements/name
       x--ro epe-stats
             |     +--ro start-time?                          yang-types:date-and-time
             |     +--ro end-time?                            yang-types:date-and-time
             |     +--ro epe-measurement-result* [object-unit-id]
             |        +--ro object-unit-id         -> /hw:hardware/component/class
             |        +--ro min?                   decimal64
             |        +--ro max?                   decimal64
             |        +--ro average?               decimal64
             +--ro epe-statistics* [measurement-object]
                   +--ro measurement-object ->
/performance-measurement-objects/epe-measurement-objects/measurement-object
                   +--ro start-time?                          yang-types:date-and-time
                   +--ro end-time?                            yang-types:date-and-time
                   +--ro epe-measurement-result* [object-unit-id]
                   |     +--ro object-unit-id         -> /hw:hardware/component/class
                   |     +--ro min?                   decimal64
                   |     +--ro max?                   decimal64
                   |     +--ro average?               decimal64
                   +--ro additional-epe-measurement-result* [start-time end-time]
                         +--ro start-time                     yang-types:date-and-time
                         +--ro end-time                       yang-types:date-and-time
                         +--ro epe-measurement-result* [object-unit-id]
                               +--ro object-unit-id ->
/hw:hardware/component/class
                               +--ro min?                     decimal64
                               +--ro max?                     decimal64
                               +--ro average?                 decimal64
```

Alternatively, when the O-RU transmits the measurement result to the existing O-DU (e.g., O-DU that supports a previous version of O-RAN M-Plane 7.0 version, O-DU that cannot decode the additional measurement result list), the O-RU may transmit leafs (e.g., start-time, end-time, and XXXX-measurement-result[ ]) capable of transmitting one measurement result. In addition, the O-RU may transmit an additional measurement result list including all of the plurality of measurement results to the O-DU capable of processing the additional measurement result list (e.g., O-DU supporting O-RAN M-Plane 7.0 version, O-DU supporting O-RAN M-Plane version 7.0 or later). This operation may be referred to as 'Method c'.

The above-described YANG model may be used in Method c as it is. However, when transmitting a notification to the existing O-DU, transmission of the additional measurement result list (e.g., additional-measurement-result[ ]) may be omitted, and only the existing leafs may be used. When a notification is transmitted to a new O-DU, transmission of leafs capable of transmitting one measurement result may be omitted, and the O-RU may transmit an additional measurement result list including all of a plurality of measurement results (e.g., additional-XXX-measurement-result[ ]) to the new O-DU. In the additional measurement result list, all measurement results (e.g., measurement results from the first measurement result to the last measurement result) may be arranged in chronological order.

The O-RU may transmit a notification including one measurement result for each measurement object to the existing O-DU. In this case, the existing O-DU may set the measurement interval and the notification interval of the O-RU to be the same so that one measurement result occurs in one notification interval. Alternatively, when the existing O-DU sets the notification interval to be longer than the measurement interval, the O-RU may transmit only the most recent measurement result among the measurement results to the existing O-DU. Detailed methods of the above-described operation are described in <Method for ensuring backward compatibility and interoperability with equipment that does not support a multi-measurement result reporting function>.

When the above-described method is used, number-of-additional-measurement-result and seq-number may not be used. A start-time and an end-time may be used as keys of additional-XXXXX-measurement list.

Alternatively, the O-RU may transmit one notification including a plurality of measurement results. In this case, the O-RU may generate additional measurement result list(s) based on the plurality of measurement results, and may transmit a notification including the additional measurement result list(s) to the O-DU. On the other hand, an O-RU that does not support the above-described operation may transmit one measurement result to the O-DU by using leafs supporting transmission of one measurement result. The existing O-DU cannot decode the additional measurement result list, but may ignore the new additional leafs (e.g., the additional measurement result list). Therefore, an error may not occur in the existing O-DU.

Alternatively, in the transmission procedure of the measurement result, as in Method a and/or Method b, the O-RU may transmit, to the O-DU, a notification including leafs including one measurement result (e.g., one measurement result per measurement object, the most recent measurement result) and an additional measurement result list including a plurality of measurement results. All of the plurality of measurement values may be included in the additional measurement result list. This operation may be referred to as 'Method d'. In this case, one measurement result (e.g., the most recent measurement result) may be included in both the existing leafs and the additional measurement result list. When Method d is used, one measurement result is transmitted redundantly, but the O-RU may not need to distinguish the type of the O-DU (e.g., existing O-DU or new O-DU). In addition, without a separate control parameter (e.g., enable-multiple-stats-in-notification), the may transmit a common notification that both the existing O-DU and the new can decode. That is, implementation complexity of the O-RU may be reduced.

Since the existing O-DU can decode leafs including one measurement result, one measurement result can be obtained from the notification received from the O-RU. The new O-DU may decode the additional measurement result list including the plurality of measurement results, and may perform a processing operation based on the plurality of measurement results.

When one measurement result occurs for each measurement object in the notification interval, the O-RU may transmit leafs including one measurement result. In this case, redundant information may be reduced. Alternatively, the O-RU may generate leafs including one measurement result and an additional measurement result list including one measurement result, and transmit the leafs including one measurement result and the additional measurement result list to the O-DU. That is, the same measurement result may be included in the leafs including one measurement result and the additional measurement result list. In this case, overhead due to transmission of the redundant information may increase, but the new O-DU may always decode the additional measurement result list instead of the existing leafs regardless of the number of measurement results. In this case, the implementation complexity of the O-DU may be reduced.

The new O-DU may support all functions of the existing O-DU. Therefore, even when the existing leafs including one measurement result are received, the new may always decode the existing leafs. On the other hand, the existing O-DU may not be able to decode the additional measurement result list. The existing O-DU may ignore the additional measurement result list (e.g., new leafs). Therefore, an error may not occur in the existing O-DU. The existing O-DU may receive the existing leafs including one measurement result and may decode the existing leafs. In Method d, the existing O-DU may always perform reception and decoding operations for one measurement result (e.g., the most recent measurement result). Therefore, the existing O-DU may operate in the existing scheme. According to the above-described scheme, the backward compatibility problem may be solved. Detailed methods of the above-described operation will be described in <Method for ensuring backward compatibility and interoperability with equipment that does not support a multi-measurement result reporting function>.

In the above-described Method 2, number-of-additional-measurement-result and seq-number may not be used, and a start-time and an end-time may be used as keys of the additional measurement result list (e.g., additional-measurement list).

<Method 3>

Alternatively, number-of-additional-measurement-result and seq-number may not be used, and the key for additional-measurement list may not be used. This operation may be 'Method 3'.

A structure of the YANG model according to Method 3 may be as follows.

```
module: o-ran-performance-management
    ... (omitted) ...
    notifications:
        +---n measurement-result-stats
           +--ro transceiver-stats* [measurement-object]
           |  +--ro measurement-object ->
/performance-measurement-objects/transceiver-measurement-objects/measurement-object
           |  +--ro start-time?                         yang-types:date-and-time
           |  +--ro end-time?                           yang-types:date-and-time
           |  +--ro transceiver-measurement-result* [object-unit-id]
           |  |  +--ro object-unit-id        -> /if:interfaces/interface/o-ran-int:port-reference/port-number
           |  |  +--ro min
           |  |  |  +--ro value?             decimal64
           |  |  |  +--ro time?              yang-types:date-and-time
           |  |  +--ro max
           |  |  |  +--ro value?             decimal64
           |  |  |  +--ro time?              yang-types:date-and-time
           |  |  +--ro first
           |  |  |  +--ro value?             decimal64
           |  |  |  +--ro time?              yang-types:date-and-time
           |  |  +--ro latest
           |  |  |  +--ro value?             decimal64
           |  |  |  +--ro time?              yang-types:date-and-time
           |  |  +--ro frequeny-table*       uint32
           |  +--ro additional-transceiver-measurement-result* [start-time end-time]
           |     +--ro start-time                       yang-types:date-and-time
           |     +--ro end-time                         yang-types:date-and-time
           |     +--ro transceiver-measurement-result* [object-unit-id]
           |        +--ro object-unit-id       -> /if:interfaces/interface/o-ran-int:port-reference/port-number
           |        +--ro min
           |        |  +--ro value?           decimal64
           |        |  +--ro time?            yang-types:date-and-time
           |        +--ro max
           |        |  +--ro value?           decimal64
           |        |  +--ro time?            yang-types:date-and-time
           |        +--ro first
           |        |  +--ro value?           decimal64
           |        |  +--ro time?            yang-types:date-and-time
           |        +--ro latest
```

```
      |        | +--ro value?         decimal64
      |        | +--ro time?          yang-types:date-and-time
      |        +--ro frequeny-table*  uint32
      +--ro rx-window-stats* [measurement-object]
         |    +--ro measurement-object ->
/performance-measurement-objects/rx-window-measurement-objects/measurement-
object
         |    +--ro start-time?                    yang-types:date-and-time
         |    +--ro end-time?                      yang-types:date-and-time
         |    +--ro (object-unit-id)?
         |    | +--:(RU)
         |    | | +--ro name?          -> /hw:hardware/component/name
         |    | | +--ro count          uint64
         |    | +--:(TRANSPORT)
         |    | | +--ro tr-measured-result* [ ]
         |    | |    +--ro name? -> /o-ran-elements:processing-elements/ru-
elements/name
         |    | |    +--ro count          uint64
         |    | +--:(EAXC_ID)
         |    |    +--ro eaxc-measured-result* [ ]
         |    |       +--ro eaxc-id?            uint16
         |    |       +--ro count               uint64
         |    |       +--ro data-direction?     Enumeration
         |    |       +--ro transport-name? -> /o-ran-elements:processing-
elements/ru-elements/name
         |    +--ro additional-rx-window-measurement-result* [start-time end-
time]
         |       +--ro start-time                     yang-types:date-and-time
         |       +--ro end-time                       yang-types:date-and-time
         |       +--ro (object-unit-id)?
         |         +--:(RU)
         |         | +--ro name?          -> /hw:hardware/component/name
         |         | +--ro count          uint64
         |         +--:(TRANSPORT)
         |         | +--ro tr-measured-result* [ ]
         |         |    +--ro name?       -> /o-ran-elements:processing-
elements/ru-elements/name
         |         |    +--ro count       uint64
         |         +--:(EAXC_ID)
         |            +--ro eaxc-measured-result* [ ]
         |               +--ro eaxc-id?           uint16
         |               +--ro count              uint64
         |               +--ro data-direction?    Enumeration
         |               +--ro transport-name? -> /o-ran-elements:processing-
elements/ru-elements/name
         +--ro tx-stats* [measurement-object]
            |    +--ro measurement-object               -> /performance-
measurement-objects/tx-measurement-objects/measurement-object
            |    +--ro start-time?                    yang-types:date-and-time
            |    +--ro end-time?                      yang-types:date-and-time
            |    +--ro (object-unit-id)?
            |    | +--:(RU)
            |    | | +--ro name?          -> /hw:hardware/component/name
            |    | | +--ro count          uint64
            |    | +--:(TRANSPORT)
            |    | | +--ro tr-measured-result* [ ]
            |    | |    +--ro name? -> /o-ran-elements:processing-elements/ru-
elements/name
            |    | |    +--ro count          uint64
            |    | +--:(EAXC_ID)
            |    |    +--ro eaxc-measured-result* [ ]
            |    |       +--ro eaxc-id?            uint16
            |    |       +--ro count               uint64
            |    |       +--ro transport-name? -> /o-ran-elements:processing-
elements/ru-elements/name
            |    +--ro additional-tx-measurement-result* [start-time end-time]
            |       +--ro start-time                     yang-types:date-and-time
            |       +--ro end-time                       yang-types:date-and-time
            |       +--ro (object-unit-id)?
            |         +--:(RU)
            |         | +--ro name? ->
/hw:hardware/component/name
            |         | +--ro count          uint64
            |         +--:(TRANSPORT)
            |         | +--ro tr-measured-result* [ ]
            |         |    +--ro name?       -> /o-ran-elements:processing-
elements/ru-elements/name
            |         |    +--ro count       uint64
            |         +--:(EAXC_ID)
```

```
        |             +--ro eaxc-measured-result* [ ]
        |                +--ro eaxc-id?            uint16
        |                +--ro count               uint64
        |             +--ro transport-name ?-> /o-ran-elements:processing-
elements/ru-elements/name
        x--ro epe-stats
        |    +--ro start-time?                    yang-types:date-and-time
        |    +--ro end-time?                      yang-types:date-and-time
        |    +--ro epe-measurement-result* [object-unit-id]
        |       +--ro object-unit-id        -> /hw:hardware/component/class
        |       +--ro min?                  decimal64
        |       +--ro max?                  decimal64
        |       +--ro average?              decimal64
        +--ro epe-statistics* [measurement-object]
              +--ro measurement-object ->
/performance-measurement-objects/epe-measurement-objects/measurement-object
              +--ro start-time?                    yang-types:date-and-time
              +--ro end-time?                      yang-types:date-and-time
              +--ro epe-measurement-result* [object-unit-id]
              |  +--ro object-unit-id        -> /hw:hardware/component/class
              |  +--ro min?                  decimal64
              |  +--ro max?                  decimal64
              |  +--ro average?              decimal64
              +--ro additional-epe-measurement-result* [start-time end-time]
                  +--ro start-time                 yang-types:date-and-time
                  +--ro end-time                   yang-types:date-and-time
                  +--ro epe-measurement-result* [object-unit-id]
                     +--ro object-unit-id ->
/hw:hardware/component/class
                     +--ro min?             decimal64
                     +--ro max?             decimal64
                     +--ro average?         decimal64
```

Alternatively, when the O-RU transmits a measurement result to the existing O-DU (e.g., O-DU that supports a previous version of O-RAN M-Plane 7.0 version, O-DU that cannot decode the additional measurement result list), the O-RU may transmit leafs (e.g., start-time, end-time, and XXX-measurement-result[ ]) capable of transmitting one measurement result. In addition, the O-RU may transmit an additional measurement result list including all of the plurality of measurement results to the O-DU capable of processing the additional measurement result list (e.g., O-DU supporting O-RAN M-Plane 7.0 version, O-DU supporting O-RAN M-Plane version 7.0 or later). This operation may be referred to as 'Method c'.

The above-described YANG model may be used in Method c as it is. However, when transmitting a notification to the existing O-DU, transmission of the additional measurement result list (e.g., additional-XXX-measurement-result[ ]) may be omitted, and only the existing leafs may be used. When a notification is transmitted to a new O-DU, transmission of leafs capable of transmitting one measurement result may be omitted, and the O-RU may transmit an additional measurement result list including all of a plurality of measurement results (e.g., additional-XXX-measurement-result[ ]) to the new O-DU. In the additional measurement result list, all measurement results (e.g., measurement results from the first measurement result to the last measurement result) may be arranged in chronological order.

The O-RU may transmit a notification including one measurement result for each measurement object to the existing O-DU. In this case, the existing O-DU may set the measurement interval and the notification interval of the O-RU to be the same so that one measurement result occurs in one notification interval. Alternatively, when the existing O-DU sets the notification interval to be longer than the measurement interval, the O-RU may transmit only the most recent measurement result among the measurement results to the existing O-DU. Detailed methods of the above-described operation are described in <Method for ensuring backward compatibility and interoperability with equipment that does not support a multi-measurement result reporting function>.

In the above-described method, number-of-additional-measurement-result and seq-number may not be used, and keys may not be used in the additional-measurement list. The modified YANG code according to this method may be defined as follows.

```
grouping measurement-notification {
    description
        "notification may contain measurement result for transceiver-stats
        and/or rx-window-stats and/or tx-stats and/or epe-stats";
    list transceiver-stats
        key "measurement-object";
        description
            "measurement result of transceiver-measurement per measurement-object";
        leaf measurement-object {
            type leafref {
                path    "/performance-measurement-objects/transceiver-measurement-objects/measurement-object";
            }
```

```
                description
                    "measurement-object for the transceiver-measurement";
            }
        uses start-and-end-time; // start-and-end-time of the first result
        uses transceiver-measurement-result-grouping; // First result
        // For additional measurement result
        list additional-transceiver-measurement-result {
                // when measurement-interval < notification interval
            config false;
            description
                    "Multiple measurement results of transceiver-measurement";
            uses start-and-end-time;
            uses transceiver-measurement-result-grouping;
        }
    }
    list rx-window-stats {
        key "measurement-object";
        description
            "measurement result for the reception window measurement per
                measurement-object";
        leaf measurement-object {
            type leafref {
                path            "/performance-measurement-objects/rx-window-
measurement-objects/measurement-object";
            }
            description
                "measurement-object for the reception window measurement";
        }
        uses start-and-end-time;
        uses rx-window-measurement-result-grouping;
        // For additional measurement result
        list additional-rx-window-measurement-result {
                // when measurement-interval < notification interval
            config false;
            description
                    "Multiple measurement results of rx-window-measurement";
                uses start-and-end-time;
            uses rx-window-measurement-result-grouping;
        }
    }
    list tx-stats {
        key "measurement-object";
        description
            "measurement result for the tx stats measurement per
                measurement-object";
        leaf measurement-object {
            type leafref {
                path        "/performance-measurement-objects/tx-measurement-
objects/measurement-object";
            }
            description
                "measurement-object for the tx stats measurement";
        }
        uses start-and-end-time;
        uses tx-measurement-result-grouping;
        // For additional measurement result
        list additional-tx-measurement-result {
            // when measurement-interval < notification interval
            config false;
            description
                    "Multiple measurement result of tx-measurement";
            uses start-and-end-time;
            uses tx-measurement-result-grouping;
        }
    }
    container epe-stats {
        description
            "container for the epe stats measurement - deprecated because
measurement object isn't included";
        status deprecated;
        uses start-and-end-time;
        uses epe-measurement-result-grouping;
    }
    list epe-statistics {
        key "measurement-object";
        description
            "measurement result for the epe stats measurement per
                measurement-object";
        leaf measurement-object {
```

```
            type leafref {
                path        "/performance-measurement-objects/epe-measurement-
objects/measurement-object";
            }
            description
                "measurement-object for the epe stats measurement";

uses start-and-end-time;
        uses epe-measurement-result-grouping;
        list additional-epe-measurement-result {
            // when measurement-interval < notification interval
            config false;
            description
                "Multiple measurement result of epe-measurement";
            uses start-and-end-time;
            uses epe-measurement-result-grouping;
        }
    }
}
```

Alternatively, the O-RU may transmit one notification including a plurality of measurement results. In this case, the O-RU may generate additional measurement result list(s) based on the plurality of measurement results, and may transmit a notification including the additional measurement result list(s) to the O-DU. On the other hand, an O-RU that does not support the above-described operation may transmit one measurement result to the O-DU by using leafs supporting transmission of one measurement result. The existing O-DU cannot decode the additional measurement result list, but may ignore the new additional leafs (e.g., the additional measurement result list). Therefore, an error may not occur in the existing O-DU.

Alternatively, in the transmission procedure of the measurement result, as in Method a and/or Method b, the O-RU may transmit, to the O-DU, a notification including leafs including one measurement result (e.g., one measurement result per measurement object, the most recent measurement result) and an additional measurement result list including a plurality of measurement results. All of the plurality of measurement values may be included in the additional measurement result list. This operation may be referred to as 'Method d'. In this case, one measurement result (e.g., the most recent measurement result) may be included in both the existing leafs and the additional measurement result list. When Method d is used, one measurement result is transmitted redundantly, but the O-RU may not need to distinguish the type of the O-DU (e.g., existing O-DU or new O-DU). In addition, without a separate control parameter (e.g., enable-multiple-stats-in-notification), the may transmit a common notification that both the existing O-DU and the new can decode. That is, implementation complexity of the O-RU may be reduced.

Since the existing O-DU can decode leafs including one measurement result, one measurement result can be obtained from the notification received from the O-RU. The new O-DU may decode the additional measurement result list including the plurality of measurement results, and may perform a processing operation based on the plurality of measurement results.

When one measurement result occurs for each measurement object in the notification interval, the O-RU may transmit leafs including one measurement result. In this case, redundant information may be reduced. Alternatively, the O-RU may generate leafs including one measurement result and an additional measurement result list including one measurement result, and transmit the leafs including one measurement result and the additional measurement result list to the O-DU. That is, the same measurement result may be included in the leafs including one measurement result and the additional measurement result list. In this case, overhead due to transmission of the redundant information may increase, but the new O-DU may always decode the additional measurement result list instead of the existing leafs regardless of the number of measurement results. In this case, the implementation complexity of the O-DU may be reduced.

The new O-DU may support all functions of the existing O-DU. Therefore, even when the existing leafs including one measurement result are received, the new may always decode the existing leafs. On the other hand, the existing O-DU may not be able to decode the additional measurement result list. The existing O-DU may ignore the additional measurement result list (e.g., new leafs). Therefore, an error may not occur in the existing O-DU. The existing O-DU may receive the existing leafs including one measurement result and may decode the existing leafs. In Method d, the existing O-DU may always perform reception and decoding operations for one measurement result (e.g., the most recent measurement result). Therefore, the existing O-DU may operate in the existing scheme. According to the above-described scheme, the backward compatibility problem may be solved. Detailed methods of the above-described operation will be described in <Method for ensuring backward compatibility and interoperability with equipment that does not support a multi-measurement result reporting function>.

In the above-described method, number-of-additional-measurement-result and seq-number may not be used, and keys of the additional-measurement list may not be used. Method a, Method b, Method c, and Method d, as well as combinations and/or variations of the method(s) described above, may be used.

Exemplary Embodiments According to Method A

In an exemplary embodiment according to [Method A], parameters may be set as shown in Table 3 below.

TABLE 3

| Parameter | Value |
| --- | --- |
| Notification interval | 60 minutes |
| Measurement interval for measurement object A (transceiver-measurement-object) | 30 minutes |
| Measurement interval for measurement object B (rx-measurement-object) | 15 minutes |

Based on the configuration in Table 3, the O-RU may transmit a notification including two measurement results for the measurement object A and four measurement results for the measurement object B to the O-DU.

When Method a is used, the first measurement result for the measurement object A (e.g., a measurement value in a measurement period of 0 to 30 minutes) may be included in the transceiver-stats in the notification, and a start-time and an end-time corresponding to the measurement period of 0 to 30 minutes may be set. The second measurement result for measurement object A (e.g., a measurement value in a measurement period of 30 to 60 minutes) may be included in additional-transceiver-measurement-result, and a start-time and an end-time corresponding to the measurement period of 30 to 60 minutes may be set.

The first measurement result for the measurement object B (e.g., a measurement value in a measurement period of 0 to 15 minutes) may be included in rx-window-stats in the notification, and a start-time and an end-time corresponding to the measurement period of 0 to 15 minutes may be set. The second measurement result for the measurement object B (e.g., a measurement value in a measurement period of 15 to 30 minutes), the third measurement result for the measurement object B (e.g., a measurement value in a measurement period of 30 to 45 minutes), and the fourth measurement result for the measurement object B (e.g., a measurement value in a measurement period of 45 to 60 minutes) may be included in additional-rx-window-measurement-result, and a start-time and an end-time corresponding to each of the measurement period of 15 to 30 minutes, the measurement period of 30 to 45 minute, and the measurement period of 45 to 60 minutes may be set. When Method b is used, the measurement result(s) from the first measurement result to the measurement result just before the last may be configured in additional-transceiver-measurement-result and additional-rx-window-measurement-result, and the last measurement result may be configured in the existing transceiver-stats and rx-window-stats (e.g., existing rx-window-stats) of each of the measurement object A and the measurement object B.

In order to arrange the measurement results in chronological order in the additional measurement result list in the communication system, the start-time and end-time, which are key values, may be set to 'ordered—by user'.

When Method c is used, the transceiver-stats for the measurement object A may be omitted within the notification, and the first measurement result (e.g., the measurement value in the measurement period of 0 to 30 minutes) and the second measurement result (e.g., the measurement value in the measurement period of 30 to 60 minutes) for the measurement object A may be included in the additional-transceiver-measurement-result within the notification. Within the notification, rx-window-stats for the measurement object B may be omitted, and the first measurement result (e.g., the measurement value in the measurement period of 0 to 15 minutes), the second measurement result (e.g., the measurement value in the measuring period of minutes), the third measurement result (e.g., the measurement value in the measurement period of 30 to 45 minutes), and the fourth measurement result (e.g., the measurement value in the measurement period of 45 to 60 minutes) for the measurement object B may all be included in additional-rx-window-measurement-result.

When Method d is used, one measurement result for the measurement object A (e.g., the last measurement value in the notification interval (e.g., the measurement value in the measurement period of 30-60 minutes)) may be included in transceiver-stats within the notification. The first measurement result (e.g., the measurement value in the measurement period of 0 to 30 minutes) and the second measurement result (e.g., the measurement value in the measurement period of 30 to 60 minutes) for the measurement object A may be included in additional-transceiver-measurement-result within the notification. One measurement result for the measurement object B (e.g., the last measurement value in the notification interval (e.g., the measurement value in the measurement period of 45 to 60 minutes)) may be included in rx-window-stats within the notification. The first measurement result (e.g., the measurement value in the measurement period of 0 to 15 minutes), the second measurement result (e.g., the measurement value in the measuring period of 15-30 minutes), the third measurement result (e.g., the measurement value in the measurement period of 30 to minutes), and the fourth measurement result (e.g., the measurement value in the measurement period of 45 to 60 minutes) for the measurement object B may all be included in additional-rx-window-measurement-result.

As a modified method of [Method A], the additional-transceiver-measurement-result, additional-rx-window-measurement-result, additional-tx-measurement-result, and additional-epe-measurement-result may be included not in the notification but in the transceiver-measurement-result, rx-window-measurement-result, tx-measurement-result, and epe-measurement-result, which belong to the front part of the YANG model, respectively. That is, the transceiver-measurement-result, rx-window-measurement-result, tx-measurement-result, and epe-measurement-result, which belong to the front part of the YANG model, may be extended. The O-DU may identify the corresponding measurement-result by using 'get RPC' instead of the notification scheme. In this case, since the O-DU periodically transmits 'get RPC', an overhead may occur accordingly.

[Method B]

In Method B, the entire structure in measurement-result-stats including measurement results of all measurement objects may be repeatedly added to the notification in chronological order for the respective measurement times.

In Method A, the YANG model may be extended, so that additional measurement result lists (e.g., additional-transceiver-measurement-result list, additional-rx-window-measurement-result list, additional-tx-measurement-result list, additional-epe-measurement-result list) are included in statistical information for measurement objects respectively belonging to transceiver-stats, rx-window-stats, tx-stats, and epe-statistics. In Method B, the additional measurement result list may not be added to the statistical information on the corresponding measurement object for each measurement object, and the entire structure in the measurementresult-stats including the measurement results of all measurement objects may be added to the notification in chronological order for the respective measurement times.

<Method B-1>

The YANG model according to <Method B-1> may be defined as follows.

```
module: o-ran-performance-management
  ... (omitted) ...
  notifications:
    +---n measurement-result-stats
       +--ro transceiver-stats* [measurement-object]
       |        +--ro measurement-object                     -> /performance-measurement-objects/transceiver-measurement-objects/measurement-object
       |        +--ro start-time?                            yang-types:date-and-time
       |        +--ro end-time?                              yang-types:date-and-time
       |        +--ro transceiver-measurement-result* [object-unit-id]
       |              +--ro object-unit-id                   -> /if:interfaces/interface/o-ran-int:port-reference/port-number
       |              +--ro min
       |              |    +--ro value?                      decimal64
       |              |    +--ro time?                       yang-types:date-and-time
       |              +--ro max
       |              |    +--ro value?                      decimal64
       |              |    +--ro time?                       yang-types:date-and-time
       |              +--ro first
       |              |    +--ro value?                      decimal64
       |              |    +--ro time?                       yang-types:date-and-time
       |              +--ro latest
       |              |    +--ro value?                      decimal64
       |              |    +--ro time?                       yang-types:date-and-time
       |              +--ro frequeny-table*                  uint32
       +--ro rx-window-stats* [measurement-object]
       |        +--ro measurement-object                     -> /performance-measurement-objects/rx-window-measurement-objects/measurement-object
       |        +--ro start-time?                            yang-types:date-and-time
       |        +--ro end-time?                              yang-types:date-and-time
       |        +--ro (object-unit-id)?
       |              +--:(RU)
       |              |    +--ro name?                       -> /hw:hardware/component/name
       |              |    +--ro count                       uint64
       |              +--:(TRANSPORT)
       |              |    +--ro tr-measured-result* [ ]
       |              |         +--ro name? -> /o-ran-elements:processing-elements/ru-elements/name
       |              |         +--ro count                  uint64
       |              +--:(EAXC_ID)
       |                   +--ro eaxc-measured-result* [ ]
       |                        +--ro eaxc-id?               uint16
       |                        +--ro count                  uint64
       |                         +--ro data-direction?       Enumeration
       |                        +--ro transport-name? -> /o-ran-elements:processing-elements/ru-elements/name
       +--ro tx-stats* [measurement-object]
       |        +--ro measurement-object                     -> /performance-measurement-objects/tx-measurement-objects/measurement-object
       |        +--ro start-time?                            yang-types:date-and-time
       |        +--ro end-time?                              yang-types:date-and-time
       |        +--ro (object-unit-id)?
       |              +--:(RU)
       |              |    +--ro name?                       -> /hw:hardware/component/name
       |              |    +--ro count                       uint64
       |              +--:(TRANSPORT)
       |              |    +--ro tr-measured-result* [ ]
       |              |         +--ro name? -> /o-ran-elements:processing-elements/ru-elements/name
       |              |         +--ro count                  uint64
       |              +--:(EAXC_ID)
       |                   +--ro eaxc-measured-result* [ ]
       |                        +--ro eaxc-id?               uint16
       |                        +--ro count                  uint64
       |                        +--ro transport-name? -> /o-ran-elements:processing-elements/ru-elements/name
       x--ro epe-stats
       |        +--ro start-time?                            yang-types:date-and-time
       |        +--ro end-time?                              yang-types:date-and-time
       |        +--ro epe-measurement-result* [object-unit-id]
       |              +--ro object-unit-id                   -> /hw:hardware/component/class
       |              +--ro min?                             decimal64
       |              +--ro max?                             decimal64
       |              +--ro average?                         decimal64
       +--ro epe-statistics* [measurement-object]
       |        +--ro measurement-object                     -> /performance-measurement-
```

```
objects/epe-measurement-objects/measurement-object
         |          +--ro start-time?                            yang-types:date-and-time
         |          +--ro end-time?                              yang-types:date-and-time
         |          +--ro epe-measurement-result* [object-unit-id]
         |             +--ro object-unit-id                      -> /hw:hardware/component/class
         |             +--ro min?                                decimal64
         |             +--ro max?                                decimal64
         |             +--ro average?                            decimal64
         +--ro number-of-additional-measurement-result-stats?                   unit8
         +--ro additional-epe-measurement-result* [seq-number]
               +--ro seq-number                                  unit8
               +--ro transceiver-stats* [measurement-object]
               |     +--ro measurement-object                    -> /performance-
measurement-objects/transceiver-measurement-objects/measurement-object
               |     +--ro start-time?                           yang-types:date-and-time
               |     +--ro end-time?                             yang-types:date-and-time
               |     +--ro transceiver-measurement-result* [object-unit-id]
               |         +--ro object-unit-id                    -> /if:interfaces/interface/o-ran-
int:port-reference/port-number
               |         +--ro min
               |         |    +--ro value?                       decimal64
               |         |    +--ro time?                        yang-types:date-and-time
               |         +--ro max
               |         |    +--ro value?                       decimal64
               |         |    +--ro time?                        yang-types:date-and-time
               |         +--ro first
               |         |    +--ro value?                       decimal64
               |         |    +--ro time?                        yang-types:date-and-time
               |         +--ro latest
               |         |    +--ro value?                       decimal64
               |         |    +--ro time?                        yang-types:date-and-time
               |         +--ro frequeny-table*                   uint32
               +--ro rx-window-stats* [measurement-object]
               |     +--ro measurement-object                    -> /performance-
measurement-objects/rx-window-measurement-objects/measurement-object
               |     +--ro start-time?                           yang-types:date-and-time
               |     +--ro end-time?                             yang-types:date-and-time
               |     +--ro (object-unit-id)?
               |         +--:(RU)
               |         |    +--ro name?                        -> /hw:hardware/component/name
               |         |    +--ro count                        uint64
               |         +--:(TRANSPORT)
               |         |    +--ro tr-measured-result* [ ]
               |         |       +--ro name?                     -> /o-ran-elements:processing-
elements/ru-elements/name
               |         |       +--ro count                     uint64
               |         +--:(EAXC_ID)
               |            +--ro eaxc-measured-result* [ ]
               |               +--ro eaxc-id?                    uint16
               |               +--ro count                       uint64
               |               +--ro data-direction?             Enumeration
               |               +--ro transport-name?             -> /o-ran-elements:processing-
elements/ru-elements/name
               +--ro tx-stats* [measurement-object]
               |     +--ro measurement-object                    -> /performance-
measurement-objects/tx-measurement-objects/measurement-object
               |     +--ro start-time?                           yang-types:date-and-time
               |     +--ro end-time?                             yang-types:date-and-time
               |     +--ro (object-unit-id)?
               |         +--:(RU)
               |         |    +--ro name?                        -> /hw:hardware/component/name
               |         |    +--ro count                        uint64
               |         +--:(TRANSPORT)
               |         |    +--ro tr-measured-result* []
               |         |       +--ro name?                     -> /o-ran-elements:processing-
elements/ru-elements/name
               |         |       +--ro count                     uint64
               |         +--:(EAXC_ID)
               |            +--ro eaxc-measured-result* [ ]
               |               +--ro eaxc-id?                    uint16
               |               +--ro count                       uint64
               |               +--ro transport-name?             -> /o-ran-elements:processing-
elements/ru-elements/name
               x--ro epe-stats
                     +--ro start-time?                           yang-types:date-and-time
                     +--ro end-time?                             yang-types:date-and-time
                     +--ro epe-measurement-result* [object-unit-id]
                         +--ro object-unit-id                    -> /hw:hardware/component/class
                         +--ro min?                              decimal64
```

```
                    |          +--ro max?                         decimal64
                    |          +--ro average?                     decimal64
                    +--ro epe-statistics* [measurement-object]
                            +--ro measurement-object              -> /performance-
measurement-objects/epe-measurement-objects/measurement-object
                            +--ro start-time?                     yang-types:date-and-time
                            +--ro end-time?                       yang-types:date-and-time
                            +--ro epe-measurement-result* [object-unit-id]
                                    +--ro object-unit-id          -> /hw:hardware/component/class
                                    +--ro min?                    decimal64
                                    +--ro max?                    decimal64
                                    +--ro average?                decimal64
```

The modified YANG code may be defined as follows.

```
    notification measurement-result-stats {
        description
            "Notification may contain measurement results for transceiver-stats
    and/or rx-window-stats";
        uses measurement-notification;
        //For sending additional measurement result when notification-interval is
    larger than measurement-interval
            leaf number-of-additional-measurement-result-stats {
                type uint8;
                description
                    "This parameter indicates the number of additional measurement
    result stats.";
            }
            list additional-measurement-result-stats {
                // For sending additional measurement result stats when
    notification-interval is larger than measurement-interval
                description
                    "Additional measurement result stats are included
                    when notification-interval is larger than measurement-interval
                    and 'enable-multiple-stats-in-notification' is true.";
                key seq-number;
                leaf seq-number {
                    //sequence number in ascending order starting from 1
                    type uint8 {
                        range "1..max";
                    }
                }
                uses measurement-notification;
            }
    }
```

When the notification interval of each measurement object is longer than the measurement interval, a plurality of measurement results for each measurement object may be included in the notification. In order to support this operation, the entire structure in measurement-result-stats including measurement result(s) in the measurement period(s) of all measurement objects belonging to each of transceiver-stats, rx-window-stats, tx-stats, and epe-statistics may be added to the notification in ascending time order for each measurement period by using the additional measurement result statistics list (e.g., additional-measurement-result-stats).

The additional measurement result statistics list may include measurement information (e.g., measurement start-time, measurement end-time, and/or measurement value for the measurement period) for each of all measurement objects in the measurement period. The structure included in one entry of the additional measurement result statistic list may be the same as the existing structure of measurement-result-stats supporting only one measurement result. The difference between the above structures may be existence of information indicating the number of entries included in the additional measurement result statistic list (e.g., number-of-additional-measurement-result-stats) and a sequence number (e.g., seq-number) included in each entry of the additional measurement result statistic list. The sequence numbers may be used to easily arrange the entries in chronological order within the additional measurement result statistics list. number-of-additional-measurement-result-stats may indicate the number of additional-measurement-result-stats entries included in the additional measurement result statistics list. The O-DU may facilitate the decoding operation of the notification based on number-of-additional-measurement-result-stats.

In addition, the O-DU may easily arrange the entries in chronological order in the additional measurement result statistics list based on the sequence numbers. When Method a is used, the sequence numbers may increase from 1 in ascending order. When Method b is used, the sequence numbers may increase from 0 in ascending order. When Method a is used, the measurement result included in the existing measurement-result-stats may be regarded as the zero-th measurement result. When Method b is used, the measurement results included in the existing measurement-result-stats may be regarded as the last measurement results. The O-DU may easily arrange measurement-result-stats in chronological order by using the sequence numbers as key values of additional-measurement-result-stats. In addition, the O-DU may easily find measurement-result-stats in a specific order by using a sequence number.

In order to reduce the number of transmission parameters, number-of-additional-measurement-result-stats may not be used. In the NETCONF/YANG model, even when the number of entries included in additional-measurement-result-stats list is not explicitly indicated, the recipient may know the number of entries. number-of-additional-measurement-result-stats may be used for decoding convenience of the recipient.

The key of additional-measurement-results-stats may not be set. When the key is not set, the O-DU may not be able to directly access a specific entry in the additional measurement result statistic list, and should always decode the whole of the additional measurement result statistic list. In the existing YANG model, one notification may include only one measurement result. If the measurement results are changed to the measurement result list, a backward compatibility problem with the fronthaul equipments (e.g., O-DU and/or O-RU) using the existing YANG model may occur. In the YANG model proposed in the present disclosure, the information structure (e.g., start-time, end-time, measurement-result) of the measurement-result-stats notification of the existing YANG model may be used as it is. The measurement-result-stats notification of the existing YANG model may include the first measurement result. Compared to the existing YANG model, the proposed YANG model may further include an additional measurement result statistics list. The additional measurement result statistics list may include measurement results from the second measurement result. The measurement results may be arranged in chronological order (e.g., in ascending order of measurement time) within the additional measurement result statistics list. This operation may be 'Method a'. According to Method a, since the measurement-related parameters used in the existing YANG model are used as they are, a backward compatibility problem may not occur.

That is, the existing O-DU that can decode only one measurement-result-stats in one notification may be able to decode the existing parameter(s) (e.g., transceiver-stats, rx-window-stats, tx-stats, epe-stats). In this case, even when the O-RU transmits one notification including a plurality of measurement results, the existing O-DU may successfully receive only one measurement result.

Alternatively, the O-RU may configure the last measurement result among the plurality of measurement results with the existing measurement result parameter, and may generate an additional measurement result statistics list (e.g., additional-measurement-result-stat) including measurement results from the first measurement result to the measurement result just before the last measurement result. This operation may be 'Method b'. According to Method b, one measurement result that the existing O-DU can receive may be the most recent measurement result.

In order to sort the additional measurement statistics result list in chronological order in the communication system, sequence numbers, which are key values, may be defined as 'ordered—by user'.

Exemplary Embodiments According to Method B-1

In an exemplary embodiment according to Method B-1, parameters may be set as shown in Table 4 below.

TABLE 4

| Parameter | Value |
| --- | --- |
| Notification interval | 60 minutes |
| Measurement interval for measurement object A | 30 minutes |
| Measurement interval for measurement object B | 15 minutes |

Based on the configuration in Table 4, the O-RU may transmit a notification including two measurement results for the measurement object A and four measurement results for the measurement object B to the O-DU. In this case, the number of entries in measurement-result-stats may be determined based on the measurement interval for the measurement object B having a shorter measurement interval.

When Method a is used, the first measurement result for the measurement object B may be included in the existing measurement-results-stats, and because a measurement operation for the measurement object A has not been completed, a measurement result for the measurement object A may not be included in the existing measurement-results-stats. That is, the existing measurement-results-stats may include measurement results in a measurement period of 0 to 15 minutes.

The first entry of additional-measurement-result-stats may include results of a measurement operation completed in a measurement period of 15 to 30 minutes (e.g., the second measurement result for the measurement object B and the first measurement result for the measurement object A). The second entry of additional-measurement-result-stats may include a result of a measurement operation completed in a measurement period of 30 to 45 minutes (e.g., the third measurement result for the measurement object B). The third entry of additional-measurement-result-stats may include results of a measurement operation completed in a measurement period of 45 to 60 minutes (e.g., the fourth measurement result for the measurement object B and the second measurement result for the measurement object A). When Method b is used, measurement result(s) from the first measurement result to the measurement result just before the last measurement result may be configured in additional-measurement-result-stats, and the last measurement result may be configured in the existing measurement-result-stat. This operation may be equally applied to <Method B-2>, which will be described later.

As a modified method of [Method B], additional-measurement-result-stats may be included not in the notification but after transceiver-measurement-result, rx-window-measurement-result, tx-measurement-result, and epe-measurement-result, which belong to the front part of the YANG model. The O-DU may identify a plurality of measurement-result-stats by using 'get RPC' instead of the notification scheme. In this case, the O-DU may periodically transmit 'get RPC', and thus an overhead may occur accordingly.

<Method B-2>

In Method B-2, number-of-additional-measurement-result-stats and seq-number may not be used, and the key for the additional-measurement-result-stats list may not be used. In this case, a structure included in one entry of the additional-measurement-result-stats list may be the same as the existing measurement-result-stats including one measurement result.

The YANG model according to Method B-2 may be defined as follows.

```
module: o-ran-performance-management
  ... (omitted) ...
  notifications:
    +---n measurement-result-stats
       +--ro transceiver-stats* [measurement-object]
       |  +--ro measurement-object                          -> /performance-
measurement-objects/transceiver-measurement-objects/measurement-object
       |  +--ro start-time?                                 yang-types:date-and-time
       |  +--ro end-time?                                   yang-types:date-and-time
       |  +--ro transceiver-measurement-result* [object-unit-id]
       |     +--ro object-unit-id                           -> /if:interfaces/interface/o-ran-int:port-
reference/port-number
       |     +--ro min
       |     |    +--ro value?                              decimal64
       |     |    +--ro time?                               yang-types:date-and-time
       |     +--ro max
       |     |    +--ro value?                              decimal64
       |     |    +--ro time?                               yang-types:date-and-time
       |     +--ro first
       |     |    +--ro value?                              decimal64
       |     |    +--ro time?                               yang-types:date-and-time
       |     +--ro latest
       |     |    +--ro value?                              decimal64
       |     |    +--ro time?                               yang-types:date-and-time
       |     +--ro frequeny-table*                          uint32
       +--ro rx-window-stats* [measurement-object]
       |  +--ro measurement-object                          -> /performance-
measurement-objects/rx-window-measurement-objects/measurement-object
       |  +--ro start-time?                                 yang-types:date-and-time
       |  +--ro end-time?                                   yang-types:date-and-time
       |  +--ro (object-unit-id)?
       |     +--:(RU)
       |     |    +--ro name?                               -> /hw:hardware/component/name
       |     |    +--ro count                               uint64
       |     +--:(TRANSPORT)
       |     |    +--ro tr-measured-result* [ ]
       |     |         +--ro name? -> /o-ran-elements:processing-elements/ru-
elements/name
       |     |         +--ro count                          uint64
       |     +--:(EAXC_ID)
       |          +--ro eaxc-measured-result* [ ]
       |               +--ro eaxc-id?                       uint16
       |               +--ro count                          uint64
       |               +--ro data-direction?                Enumeration
       |               +--ro transport-name? -> /o-ran-elements:processing-
elements/ru-elements/name
       +--ro tx-stats* [measurement-object]
       |  +--ro measurement-object                          -> /performance-
measurement-objects/tx-measurement-objects/measurement-object
       |  +--ro start-time?                                 yang-types:date-and-time
       |  +--ro end-time?                                   yang-types:date-and-time
       |  +--ro (object-unit-id)?
       |     +--:(RU)
       |     |    +--ro name?                               -> /hw:hardware/component/name
       |     |    +--ro count                               uint64
       |     +--:(TRANSPORT)
       |     |    +--ro tr-measured-result* [ ]
       |     |         +--ro name? -> /o-ran-elements:processing-elements/ru-
elements/name
       |     |         +--ro count                          uint64
       |     +--:(EAXC_ID)
       |          +--ro eaxc-measured-result* [ ]
       |               +--ro eaxc-id?                       uint16
       |               +--ro count                          uint64
       |               +--ro transport-name? -> /o-ran-elements:processing-
elements/ru-elements/name
       x--ro epe-stats
       |  +--ro start-time?                                 yang-types:date-and-time
       |  +--ro end-time?                                   yang-types:date-and-time
       |  +--ro epe-measurement-result* [object-unit-id]
       |     +--ro object-unit-id                           -> /hw:hardware/component/class
       |     +--ro min?                                     decimal64
       |     +--ro max?                                     decimal64
       |     +--ro average?                                 decimal64
       +--ro epe-statistics* [measurement-object]
       |  +--ro measurement-object                          -> /performance-measurement-
objects/epe-measurement-objects/measurement-object
          +--ro start-time?                                 yang-types:date-and-time
          +--ro end-time?                                   yang-types:date-and-time
          +--ro epe-measurement-result* [object-unit-id]
             +--ro object-unit-id                           -> /hw:hardware/component/class
```

```
        |     +--ro min?                                       decimal64
        |     +--ro max?                                       decimal64
        |     +--ro average?                                   decimal64
        +--ro additional-measurement-result-stats* [ ]
           +--ro transceiver-stats* [measurement-object]
            | +--ro measurement-object                         -> /performance-
measurement-objects/transceiver-measurement-objects/measurement-object
            | +--ro start-time?                                yang-types:date-and-time
            | +--ro end-time?                                  yang-types:date-and-time
            | +--ro transceiver-measurement-result* [object-unit-id]
            |        +--ro object-unit-id                      -> /if:interfaces/interface/o-ran-
int:port-reference/port-number
            |        +--ro min
            |        |   +--ro value?                          decimal64
            |        |   +--ro time?                           yang-types:date-and-time
            |        +--ro max
            |        |   +--ro value?                          decimal64
            |        |   +--ro time?                           yang-types:date-and-time
            |        +--ro first
            |        |   +--ro value?                          decimal64
            |        |   +--ro time?                           yang-types:date-and-time
            |        +--ro latest
            |        |   +--ro value?                          decimal64
            |        |   +--ro time?                           yang-types:date-and-time
            |        +--ro frequeny-table*                     uint32
           +--ro rx-window-stats* [measurement-object]
            | +--ro measurement-object                         -> /performance-
measurement-objects/rx-window-measurement-objects/measurement-object
            | +--ro start-time?                                yang-types:date-and-time
            | +--ro end-time?                                  yang-types:date-and-time
            | +--ro (object-unit-id)?
            |    +--:(RU)
            |    |   +--ro name?                               -> /hw:hardware/component/name
            |    |   +--ro count                               uint64
            |    +--:(TRANSPORT)
            |    |   +--ro tr-measured-result* [ ]
            |    |       +--ro name?                           -> /o-ran-elements:processing-
elements/ru-elements/name
            |    |       +--ro count                           uint64
            |    +--:(EAXC_ID)
            |        +--ro eaxc-measured-result* [ ]
            |            +--ro eaxc-id?                        uint16
            |            +--ro count                           uint64
            |            +--ro data-direction?                 Enumeration
            |            +--ro transport-name? -> /o-ran-elements:processing-
elements/ru-elements/name
           +--ro tx-stats* [measurement-object]
            | +--ro measurement-object                         -> /performance-
measurement-objects/tx-measurement-objects/measurement-object
            | +--ro start-time?                                yang-types:date-and-time
            | +--ro end-time?                                  yang-types:date-and-time
            | +--ro (object-unit-id)?
            |    +--:(RU)
            |    |   +--ro name?                               -> /hw:hardware/component/name
            |    |   +--ro count                               uint64
            |    +--:(TRANSPORT)
            |    |   +--ro tr-measured-result* [ ]
            |    |       +--ro name?                           -> /o-ran-elements:processing-
elements/ru-elements/name
            |    |       +--ro count                           uint64
            |    +--:(EAXC_ID)
            |        +--ro eaxc-measured-result* [ ]
            |            +--ro eaxc-id?                        uint16
            |            +--ro count                           uint64
            |            +--ro transport-name?->/o-ran-elements:processing-
elements/ru-elements/name
            x--ro epe-stats
            | +--ro start-time?                                yang-types:date-and-time
            | +--ro end-time?                                  yang-types:date-and-time
            | +--ro epe-measurement-result* [object-unit-id]
            |        +--ro object-unit-id                      -> /hw:hardware/component/class
            |        +--ro min?                                decimal64
            |        +--ro max?                                decimal64
            |        +--ro average?                            decimal64
           +--ro epe-statistics* [measurement-object]
               +--ro measurement-object                        -> /performance-
measurement-objects/epe-measurement-objects/measurement-object
                  +--ro start-time?                            yang-types:date-and-time
                  +--ro end-time?                              yang-types:date-and-time
```

```
+--ro epe-measurement-result* [object-unit-id]
    +--ro object-unit-id            -> /hw:hardware/component/class
    +--ro min?                      decimal64
    +--ro max?                      decimal64
    +--ro average?                  decimal64
```

The modified YANG code may be defined as follows.

```
notification measurement-result-stats {
    description
        "Notification may contain measurement results for transceiver-stats
and/or rx-window-stats";
    uses measurement-notification;
    // For sending additional measurement result when notification-interval
is larger than measurement-interval
    list additional-measurement-result-stats {
        // For sending additional measurement result stats when notification-
interval is larger than measurement-interval
        description
            "Additional measurement result stats are included
when notification-interval is larger than measurement-interval and
'enable-multiple-stats-in-notification' is true.";
        uses measurement-notification;
    }
}
```

<Method for Ensuring Backward Compatibility and Interoperability with Equipment that does not Support a Multi-Measurement Result Reporting Function>

The existing O-RU (e.g., O-RU supporting a version earlier than O-RAN M-Plane version 7.0) cannot transmit one notification including a plurality of measurement results. That is, one notification may include only one measurement result. When the O-DU sets the measurement interval and the notification interval to be the same, since only one measurement result is included in one notification, all measurement results may be transmitted and received by individual notifications. This operation may be referred to as (Method alpha).

When the O-DU sets the notification interval to be longer than the measurement interval, the O-RU (e.g., the existing O-RU that cannot transmit one notification including a plurality of measurement results) may transmit a notification including only the most recent measurement result among the plurality of measurement results to the O-DU. This operation may be referred to as (Method beta). The existing O-DU cannot interpret the notification including the plurality of measurement results. Accordingly, when (Method alpha) is used, it may be prevented that the existing O-DU receives a list including a plurality of measurement results. In addition, when (Method alpha) is used, it may be prevented that the O-RU (e.g., new O-RU) transmits a plurality of measurement results using one notification. This operation may be particularly useful in the case of transmitting measurement results to the existing O-DU that cannot interpret the notification including the plurality of measurement results. (Method beta) may be useful even when the O-DU (e.g., existing O-DU or new O-DU) wants to receive a notification including only some measurement results in order to reduce the processing load on the communication system.

Even when the O-RU can transmit one notification including a plurality of measurement results, the O-DU may limit the number of measurement results included in the notification to one in order to reduce the burden of processing the measurement results. For example, the O-DU may set enable-multiple-stats-in-notification to FALSE, and in this case, the O-RU may transmit a notification including one measurement result (e.g., the most recent measurement result) among a plurality of measurement results even when the notification interval is longer than the measurement interval.

When a default value of enable-multiple-stats-in-notification is defined as FALSE and the new O-RU operates with the existing O-DU, since enable-multiple-stats-in-notification is always set to FALSE, the new O-RU may transmit one measurement result (e.g., the most recent measurement result) to the existing O-DU even when the notification interval is set longer than the measurement interval. When the default value of enable-multiple-stats-in-notification is defined as FALSE and the new O-RU operates with the new O-DU, both of one notification including one measurement result and one notification including a plurality of measurement results may be used.

The new O-DU may set enable-multiple-stats-in-notification of the new O-RU to FALSE. In this case, the new O-RU may transmit one measurement result to the new O-DU using leafs supporting transmission of one measurement result. Alternatively, the new O-RU may transmit a measurement result list including one measurement result to the new O-DU. The new O-RU may use leafs supporting transmission of one measurement result to transmit the notification to the existing O-DU.

The YANG model of the O-RU may indicate the O-RAN M-Plane version supported by the O-RU. Therefore, the O-DU may identify whether the O-RU supports a function of transmitting one notification including a plurality of measurement results (i.e., multi-measurement result reporting function) based on the M-Plane version supported by the O-RU.

As another method of limiting the number of measurement results included in the notification to reduce a burden of processing measurement results, max-number-of-measurement-result-per-notification indicating the maximum number of measurement results included in one notification may be set. That is, max-number-of-measurement-resultper-notification may be added to the YANG model. The O-DU may set max-number-of-measurement-result-per-notification to the O-RU. The may transmit, to the O-DU, one notification including measurement results less than or equal to the maximum number indicated by max-number-of-measurement-result-per-notification.

When Method a, Method b, Method c, and/or Method d is used, backward compatibility can be guaranteed and interoperability with equipment that does not support multi-measurement result notification can be guaranteed. When Method a, Method b, Method c, and/or Method d is used, the O-RU may not know whether one notification including a plurality of measurement results is decodable by the O-DU.

When the O-DU supports the O-RAN M-Plane version earlier than 7.0, when the O-DU supporting the O-RAN M-Plane 7.0 version or later does not support the decoding function of multiple measurement results, or when the O-DU supporting the M-Plane 7.0 version or later does not use the decoding function of a plurality of measurement results, if the O-RU transmits one notification including a plurality of measurement results, the plurality of measurement results may not be decoded by the O-DU. In addition, the O-DU may not know whether the O-RU supports the multi-measurement result reporting function. If the notification interval for the O-RU that does not support the multi-measurement result reporting function is set to be longer than the measurement interval, the O-DU may not receive some measurement results from the O-RU.

In order to solve the above-described problem, the O-RU may inform the O-DU of a capability indicating whether the O-RU supports the multi-measurement result reporting function. The above-described capability-related parameter may be indicated to the O-DU through the M-Plane. The O-DU may identify whether the O-RU supports the multi-measurement result reporting function based on the capability related parameter of the O-RU. When the O-RU supports the multi-measurement result reporting function, the O-DU may instruct the O-RU to enable the multi-measurement result reporting function. When the multi-measurement result reporting function is explicitly enabled, the O-RU may transmit one notification including a plurality of measurement results to the O-DU. The above-described operation may be referred to as (Method I). In order to support (Method I), the existing o-ran-performance-management.yang module may be extended as follows.

```
+--rw transceiver-measurement-interval?           uint16
+--rw epe-measurement-interval?                   uint16
+--rw rx-window-measurement-interval?             uint16
+--rw tx-measurement-interval?                    uint16
+--rw notification-interval?                      uint16
+--rw file-upload-interval?                       uint16
+--ro max-bin-count                               uint16
+--ro multiple-stats-in-notification-capable?     boolean
+--rw enable-multiple-stats-in-notification?      boolean
```

That is, ro multiple-stats-in-notification-capable and rw enable-multiple-stats-in-notification may added to the YANG model. The extended YANG code according to (Method I) may defined as follows.

```
module: o-ran-performance-management
    ... (omitted) ....
    leaf max-bin-count{
        type uint16;
        config false;
        mandatory true;
        description
            "indicates the maximum value of configurable bin-count for
frequency table in transceiver-measurement-objects as one of module
capabilities.";
    }
    leaf multiple-stats-in-notification-capable{
        type boolean;
        config false;
        default false;
        description
            "Flag to indicate whether the O-RU is capable of sending a
notification including multiple stats when notification-interval is larger than
measurement-interval.";
    }
    leaf enable-multiple-stats-in-notification {
        type boolean;
        default false;
        description
            "Flag to enable multiple stats to be included in one notification
            when notification-interval is larger than measurement-interval and
'multiple-stats-in-notification-capable' is true.";
    }
``` multiple-stats-in-notification-capable may be a capability indicating whether the O-RU supports the multi-measurement result reporting function when the notification interval is longer than the measurement interval. The default value of multiple-stats-in-notification-capable may be FALSE.

enable-multiple-stats-in-notification may be configured by the O-DU. When multiple-stats-in-notification-capable of the O-RU is set to TRUE, the O-DU may set enable-multiple-stats-in-notification to TRUE. In this case, when the notification interval is longer than the measurement interval, the O-RU may transmit one notification including a plurality of measurement results to the O-DU. The default value of enable-multiple-stats-in-notification may be FALSE.

The O-DU may decode a plurality of measurement results included in one notification, and the O-RU may not support the multi-measurement result reporting function. That is, the O-DU may be the new O-DU, and the O-RU may be the existing O-RU. In this case, multiple-stats-in-notification-capable may not exist in the YANG parameters of the O-RU. That is, since multiple-stats-in-notification-capable is set to the default value (i.e., FALSE), the O-DU may determine that the O-RU does not support the multi-measurement result reporting function. In this case, the O-DU may not use the multi-measurement result reporting function or set the parameter(s) of the O-RU so that the notification interval is not longer than the measurement interval. Even the new O-RU may not support the multi-measurement result reporting function. In this case, the O-RU may set multiple-stats-in-notification-capable to FALSE. If multiple-stats-in-notification-capable of the new is set to FALSE, the O-DU may not use the multi-measurement result reporting function. Alternatively, the O-DU may set the parameter(s) of the O-RU so that the notification interval is not longer than the measurement interval.

When the O-RU supports the multi-measurement result reporting function and the O-DU does not support the multi-measurement result reporting function, the O-DU may not set enable-multiple-stats-in-notification of the O-RU to TRUE. Accordingly, the O-RU may not transmit one notification including a plurality of measurement results to the O-DU.

The existing O-DU that cannot interpret enable-multiple-stats-in-notification may not set enable-multiple-stats-in-notification. In this case, enable-multiple-stats-in-notification may be set to the default value (i.e., FALSE). Accordingly, the O-RU may not transmit one notification including a plurality of measurement results to the O-DU.

As a variant of the above-described method, the new O-RU (e.g., O-RU supporting the O-RAN M-Plane 7.0 version, O-RU supporting the O-RAN M-Plane version 7.0 or later) may always support the multi-measurement result reporting function. This operation may be referred to as (Method II). In this case, multiple-stats-in-notification-capable may not need to be used. The O-DU may identify that the O-RU is the existing O-RU based on information of the O-RAN M-Plane version of the YANG model. If the O-DU identifies that the O-RU is the existing O-RU, the measurement interval and the notification interval for the existing O-RU may be set identically by the O-DU. If the O-DU identifies that the O-RU is the new O-RU, since the new O-RU can transmit a plurality of measurement lists in one notification, the O-DU may set the measurement interval and the notification interval for the new differently.

When the notification interval is set to be longer than the measurement interval, the existing O-RU may transmit one notification including the most recent measurement result among the measurement results to the O-DU. In this case, multiple-stats-in-notification-capable is not required, so only enable-multiple-stats-in-notification may be added to the YANG model. The default value of enable-multiple-stats-in-notification may be set to FALSE. When the O-DU sets enable-multiple-stats-in-notification to TRUE, and the notification interval for the O-RU is longer than the measurement interval, the O-RU may transmit one notification including a plurality of measurement results to the O-DU.

In order to reduce the burden of processing measurement results as in (Method beta), the O-DU may limit the number of measurement results included in one notification to one. enable-multiple-stats-in-notification may be set to FALSE, and even when the notification interval is longer than the measurement interval, the O-RU may transmit a notification including the most recent measurement result among a plurality of measurement results to the O-DU. When the default value of enable-multiple-stats-in-notification is set to FALSE and the new O-RU operates with the existing O-DU, since the value of enable-multiple-stats-in-notification of the O-RU is always set to FALSE, the new O-RU may transmit one measurement result (e.g., the most recent measurement result) among a plurality of measurement results to the O-DU when the notification interval is longer than the measurement interval.

When the new O-RU operates with the new O-DU, both one notification including one measurement result and one notification including a plurality of measurement results may be used. When the new O-DU sets the enable-multiple-stats-in-notification of the new O-RU to FALSE, the new O-RU may use the existing leafs supporting transmission of one measurement result or the additional measurement result list to transmit one measurement result. The new O-RU may transmit one measurement result to the existing O-DU by using the existing leafs that support transmission of one measurement result.

Even when the new O-RU optionally supports the multi-measurement result reporting function, the above-described (Method II) may be used. This operation may be referred to as (Method III). In this case, multiple-stats-in-notification-capable may not be added to the YANG model. enable-multiple-stats-in-notification may be added to the YANG model. When the O-DU sets enable-multiple-stats-in-notification to TRUE, when the O-RU does not support the multi-measurement result reporting function, or when the O-RU does not use the multi-measurement result reporting function, the O-RU may transmit one measurement result to the O-DU by using the existing leafs that support transmission of one measurement result. The remaining operations may be the same as (Method II) described above.

The new O-RU may optionally support multiple measurement lists, and both multiple-stats-in-notification-capable and enable-multiple-stats-in-notification may not be added to the YANG model. This operation may be referred to as (Method IV). The O-RU supporting the multi-measurement result reporting function may generate a measurement result list(s) including a plurality of measurement results, and may transmit a notification including the measurement result list(s). The O-RU that does not support the multi-measurement result reporting function may transmit one measurement result to the O-DU by using the existing leafs that support transmission of one measurement result.

When Method a, Method b, and/or Method d is used, the existing leafs including one measurement result may be transmitted together with measurement result list(s) including a plurality of measurement results. The existing O-DU (e.g., O-DU supporting the old YANG model) may not be able to decode the measurement result list(s) included in the notification, and may ignore the new leafs (e.g., measurement result list(s)). Accordingly, an error may not occur in the existing O-DU.

(Others)

When the existing O-DU operates with the new O-RU, and the existing O-DU sets the measurement interval to be equal to the notification interval for the new O-RU, it may be prevented that the existing O-DU receives one notification including a plurality of measurement results from the new O-RU. Since one measurement result occurs in one notification interval, the new O-RU may transmit one notification including one measurement result according to the existing scheme. When this method is used, multiple-stats-in-notification-capable and enable-multiple-stats-in-notification may not need to be used. When one measurement result is transmitted using the existing leafs instead of the additional measurement result list, the existing can always decode the measurement result. Therefore, a backward compatibility problem may not occur. The operation described above may be useful in Method c.

When Method c is used, the existing O-DU may set the measurement interval and the notification interval to be the same. In this case, only one measurement result may occur in one notification interval. The O-RU may transmit one measurement result to the existing O-DU by using the existing leafs supporting transmission of one measurement result. The existing O-DU may decode the measurement result received from the O-RU. The new O-DU may set the notification interval to be longer than the measurement interval. In this case, a plurality of measurement results may occur in one notification interval. The O-RU may generate a measurement result list including a plurality of measurement results, and may transmit a notification including the measurement result list to the new O-DU. The new O-DU may decode the measurement result list received from the O-RU. That is, when the notification interval is longer than the measurement interval, the multi-measurement result reporting function may be enabled. If the notification interval is not longer than the measurement interval, the multi-measurement result reporting function may be disabled.

In Method a, Method b, and/or Method d, the notification may always include the existing leafs supporting transmission of one measurement result. Therefore, since the existing O-DU can decode the notification received from the O-RU, a backward compatibility problem may not occur.

According to the method(s) described above, backward compatibility can be guaranteed, and interoperability with equipment that does not support the multi-measurement result reporting function can be guaranteed.

In order to prevent transmission of one notification including a plurality of measurement results, a separate notification interval parameter for each measurement object may be used. The notification interval may be set for each measurement object. Notification intervals for measurement objects may be set differently. For example, parameters for transceiver-notification-interval, rx-window-notification-interval, tx-stats-notification-interval, epe-stats-notification-interval, and/or rssi-stats-notification-interval may be respectively set. Even when the measurement intervals of the measurement objects are different from each other, the notification interval of each measurement object may be set not to be longer than the measurement interval of the corresponding measurement object. According to the above-described method, one notification including a plurality of measurement results may be prevented from being transmitted.

Various measurement objects may be introduced in the O-RAN, and the multi-measurement result reporting function for new measurement objects according to the above-described method(s) may be applied. For example, a notification for an RSSI object (e.g., time domain RSSI object) may be defined as follows.

```
notification
  ... (omitted) ...
  +--ro symbol-rssi-stats* [measurement-object]
    +--ro measurement-object        -> /performance-measurement-objects/symbol-rssi-measurement-objects/measurement-object
    +--ro start-time?               yang-types:date-and-time
    +--ro end-time?                 yang-types:date-and-time
    +--ro symbol-rssi-measurement-result* [object-unit-id]
      +--ro object-unit-id          ->   /up:user-plane-configuration/rx-array-carriers/name
        +--ro per-symbol-index-result* [symbol-index]
          +--ro symbol-index        uint16
          +--ro min
          |   +--ro value?          int16
          +--ro max
          |   +--ro value?          int16
          +--ro avg
          |   +--ro value?          int16
          +--ro frequency-table*    uint32
... (omitted) ...
```

One notification including one measurement result as above may be extended similarly to the method(s) described above. That is, one notification may be extended to include a plurality of measurement results. For example, applying the first scheme of Method A, the YANG model may be defined as follows.

```
notifications:
  +---n measurement-result-stats
     ...
     +--ro symbol-rssi-stats* [measurement-object]
       +--ro measurement-object          -> /performance-measurement-objects/symbol-rssi-measurement-objects/measurement-object
       +--ro start-time?                 yang-types:date-and-time
       +--ro end-time?                   yang-types:date-and-time
       +--ro symbol-rssi-measurement-result* [object-unit-id]
         +--ro object-unit-id            ->         /up:user-plane-configuration/rx-array-carriers/name
           +--ro per-symbol-index-result* [symbol-index]
             +--ro symbol-index          uint16
             +--ro min
             |    +--ro value?           int16
             +--ro max
             |    +--ro value?           int16
             +--ro avg
             |    +--ro value?           int16
             +--ro frequency-table*      uint32
       +--ro number-of-additional-measurement-result?       uint8
       +--ro additional-symbol-rssi-measurement-result* [seq-number]
         +--ro seq-number                uint8
         +--ro start-time?               yang-types:date-and-time
         +--ro end-time?                 yang-types:date-and-time
         +--ro symbol-rssi-measurement-result* [object-unit-id]
           +--ro object-unit-id          ->         /up:user-plane-configuration/rx-array-carriers/name
             +--ro per-symbol-index-result* [symbol-index]
               +--ro symbol-index        uint16
```

```
            +--ro min
               +--ro value?           int16
            +--ro max
               +--ro value?           int16
            +--ro avg
               +--ro value?           int16
            +--ro frequency-table*    uint32
```

Applying the second scheme of Method A, the YANG model may be defined as follows.

```
notifications:
    +---n measurement-result-stats
        ...
        +--ro symbol-rssi-stats* [measurement-object]
            +--ro measurement-object     -> /performance-measurement-objects/symbol-rssi-measurement-objects/measurement-object
            +--ro start-time?               yang-types:date-and-time
            +--ro end-time?                 yang-types:date-and-time
            +--ro symbol-rssi-measurement-result* [object-unit-id]
                +--ro object-unit-id        ->        /up:user-plane-configuration/rx-array-carriers/name
                    +--ro per-symbol-index-result* [symbol-index]
                        +--ro symbol-index           uint16
                        +--ro min
                        |    +--ro value?            int16
                        +--ro max
                        |    +--ro value?            int16
                        +--ro avg
                        |    +--ro value?            int16
                        +--ro frequency-table*       uint32
            +--ro additional-symbol-rssi-measurement-result*    [start-time end-time]
                +--ro start-time?               yang-types:date-and-time
                +--ro end-time?                 yang-types:date-and-time
                +--ro symbol-rssi-measurement-result* [object-unit-id]
                    +--ro object-unit-id        ->        /up:user-plane-configuration/rx-array-carriers/name
                        +--ro per-symbol-index-result* [symbol-index]
                            +--ro symbol-index       uint16
                            +--ro min
                               +--ro value?          int16
                            +--ro max
                               +--ro value?          int16
                            +--ro avg
                               +--ro value?          int16
                            +--ro frequency-table*   uint32
```

Applying the third scheme of Method A, the YANG model may be defined as follows.

```
notifications:
    +---n measurement-result-stats
        ...
        +--ro symbol-rssi-stats* [measurement-object]
            +--ro measurement-object     -> /performance-measurement-objects/symbol-rssi-measurement-objects/measurement-object
            +--ro start-time?               yang-types:date-and-time
            +--ro end-time?                 yang-types:date-and-time
            +--ro symbol-rssi-measurement-result* [object-unit-id]
                +--ro object-unit-id        ->        /up:user-plane-configuration/rx-array-carriers/name
                    +--ro per-symbol-index-result* [symbol-index]
                        +--ro symbol-index           uint16
                        +--ro min
                        |   +--ro value?             int16
                        +--ro max
                        |   +--ro value?             int16
                        +--ro avg
                        |   +--ro value?             int16
                        +--ro frequency-table*       uint32
            +--ro additional-symbol-rssi-measurement-result* [ ]
                +--ro start-time?               yang-types:date-and-time
```

```
          +--ro end-time?                       yang-types:date-and-time
          +--ro symbol-rssi-measurement-result* [object-unit-id]
             +--ro object-unit-id        ->       /up:user-plane-
configuration/rx-array-carriers/name
                +--ro per-symbol-index-result* [symbol-index]
                   +--ro symbol-index           uint16
                   +--ro min
                      +--ro value?              int16
                   +--ro max
                      +--ro value?              int16
                   +--ro avg
                      +--ro value?              int16
                   +--ro frequency-table*       uint32
```

Applying the first scheme of Method B, the YANG model may be defined as follows.

```
notifications:
  +---n measurement-result-stats
     +--ro transceiver-stats* [measurement-object]
        ...
     +--ro rx-window-stats* [measurement-object]
        ...
     +--ro tx-stats* [measurement-object]
        ...
     +--ro epe-statistics* [measurement-object]
        ...
     +--ro symbol-rssi-stats* [measurement-object]
        ...
     +--ro number-of-additional-measurement-result-stats?     uint8
     +--ro additional-measurement-result-stats* [seq-number]
        +--ro seq-number                         uint8
        +--ro transceiver-stats* [measurement-object]
           ...
        +--ro rx-window-stats* [measurement-object]
           ...
        +--ro tx-stats* [measurement-object]
           ...
        +--ro epe-statistics* [measurement-object]
           ...
        +--ro symbol-rssi-stats* [measurement-object]
           +--ro measurement-object               -> /performance-
measurement-objects/symbol-rssi-measurement-objects/measurement-object
              +--ro start-time?                 yang-types:date-and-time
              +--ro end-time?                   yang-types:date-and-time
              +--ro symbol-rssi-measurement-result* [object-unit-id]
                 +--ro object-unit-id      ->       /up:user-plane-
configuration/rx-array-carriers/name
                    +--ro per-symbol-index-result* [symbol-index]
                       +--ro symbol-index         uint16
                       +--ro min
                          +--ro value?          int16
                       +--ro max
                          +--ro value?          int16
                       +--ro avg
                          +--ro value?          int16
                       +--ro frequency-table*   uint32
```

Applying the second scheme of Method B, the YANG model may be defined as follows.

```
notifications:
  +---n measurement-result-stats
     +--ro transceiver-stats* [measurement-object]
        ...
     +--ro rx-window-stats* [measurement-object]
        ...
     +--ro tx-stats* [measurement-object]
        ...
     +--ro epe-statistics* [measurement-object]
        ...
     +--ro symbol-rssi-stats* [measurement-object]
        ..
     +--ro additional-measurement-result-stats* [ ]
        +--ro transceiver-stats* [measurement-object]
           ...
        +--ro rx-window-stats* [measurement-object]
           ...
        +--ro tx-stats* [measurement-object]
           ...
        +--ro epe-statistics* [measurement-object]
           ...
        +--ro symbol-rssi-stats* [measurement-object]
           +--ro measurement-object     -> /performance-measurement-
```

```
objects/symbol-rssi-measurement-objects/measurement-object
   +--ro start-time?                    yang-types:date-and-time
   +--ro end-time?                      yang-types:date-and-time
   +--ro symbol-rssi-measurement-result* [object-unit-id]
      +--ro object-unit-id     ->     /up:user-plane-
configuration/rx-array-carriers/name
      +--ro per-symbol-index-result* [symbol-index]
         +--ro symbol-index        uint16
         +--ro min
         |  +--ro value?           int16
         +--ro max
         |  +--ro value?           int16
         +--ro avg
```

```
         +--ro value?           int16
         +--ro frequency-table* uint32
```

<Method of Transmitting a Separate Notification Including a Plurality of Measurement Results>

Without adding additional-xxxx-measurement-result to the existing notification, the O-RU may transmit a separate notification including a plurality of measurement results.

In Method c of the third scheme of [Method A], a separate notification including additional-xxxx-measurement-result may be transmitted. The YANG model for this operation may be defined as follows.

```
module: o-ran-performance-management
   ... (omitted) ...
   notifications:
      +---n measurement-result-stats
      |  +--ro transceiver-stats* [measurement-object]
      |  |     +--ro measurement-object                                -> /performance-
measurement-objects/transceiver-measurement-objects/measurement-object
      |  |     +--ro start-time?                         yang-types:date-and-time
      |  |     +--ro end-time?                           yang-types:date-and-time
      |  |     +--ro transceiver-measurement-result* [object-unit-id]
      |  |        +--ro object-unit-id         -> /if:interfaces/interface/o-ran-int:port-
reference/port-number
      |  |        +--ro min
      |  |        |   +--ro value?             decimal64
      |  |        |   +--ro time?              yang-types:date-and-time
      |  |        +--ro max
      |  |        |   +--ro value?             decimal64
      |  |        |   +--ro time?              yang-types:date-and-time
      |  |        +--ro first
      |  |        |   +--ro value?             decimal64
      |  |        |   +--ro time?              yang-types:date-and-time
      |  |        +--ro latest
      |  |        |   +--ro value? decimal64
      |  |        |   +--ro time? yang-types:date-and-time
      |  |        +--ro frequeny-table*        uint32
      |  +--ro rx-window-stats* [measurement-object]
      |  |     +--ro measurement-object                                -> /performance-
measurement-objects/rx-window-measurement-objects/measurement-object
      |  |     +--ro start-time?                         yang-types:date-and-time
      |  |     +--ro end-time?                           yang-types:date-and-time
      |  |     +--ro (object-unit-id)?
      |  |        +--:(RU)
      |  |        |   +--ro name?              -> /hw:hardware/component/name
      |  |        |   +--ro count              uint64
      |  |        +--:(TRANSPORT)
      |  |        |   +--ro tr-measured-result* [ ]
      |  |        |      +--ro name ?- >       /o-ran-elements:processing-elements/ru-
elements/name
      |  |        |      +--ro count           uint64
      |  |        +--:(EAXC_ID)
      |  |           +--ro eaxc-measured-result* [ ]
      |  |              +--ro eaxc-id?         uint16
      |  |              +--ro count            uint64
      |  |              +--ro data-direction?  enumeration
      |  |              +--ro transport-name?  -> /o-ran-elements:processing-
elements/ru-elements/name
      |  +--ro tx-stats* [measurement-object]
      |  |  +--ro measurement-object                                   -> /performance-
measurement-objects/tx-measurement-objects/measurement-object
      |  |     +--ro start-time?                         yang-types:date-and-time
      |  |     +--ro end-time?                           yang-types:date-and-time
      |  |     +--ro (object-unit-id)?
      |  |        +--:(RU)
      |  |        |   +--ro name?              -> /hw:hardware/component/name
      |  |        |   +--ro count              uint64
      |  |        +--:(TRANSPORT)
      |  |        |   +--ro tr-measured-result* [ ]
      |  |        |      +--ro name ?->        /o-ran-elements:processing-elements/ru-
elements/name
      |  |        |      +--ro count           uint64
      |  |        +--:(EAXC_ID)
      |  |           +--ro eaxc-measured-result* [ ]
      |  |              +--ro eaxc-id?         uint16
```

```
    |  |                       +--ro count                     uint64
    |  |                       +--ro transport-name?           -> /o-ran-elements:processing-
elements/ru-elements/name
    |  x--ro epe-stats
    |  |     +--ro start-time?                                 yang-types:date-and-time
    |  |     +--ro end-time?                                   yang-types:date-and-time
    |  |     +--ro epe-measurement-result* [object-unit-id]
    |  |        +--ro object-unit-id                           -> /hw:hardware/component/class
    |  |        +--ro min?                                     decimal64
    |  |        +--ro max?                                     decimal64
    |  |        +--ro average?                                 decimal64
    |  +--ro epe-statistics* [measurement-object]
    |        +--ro measurement-object                          -> /performance-
measurement-objects/epe-measurement-objects/measurement-object
    |        +--ro start-time?                                 yang-types:date-and-time
    |        +--ro end-time?                                   yang-types:date-and-time
    |        +--ro epe-measurement-result* [object-unit-id]
    |           +--ro object-unit-id                           -> /hw:hardware/component/class
    |           +--ro min?                                     decimal64
    |           +--ro max?                                     decimal64
    |           +--ro average?                                 decimal64
    +---n multiple-measurement-result-stats
       +--ro multiple-transceiver-stats* [measurement-object]
       |  +--ro measurement-object                             -> /performance-measurement-
objects/transceiver-measurement-objects/measurement-object
       |  +--ro additional-transceiver-measurement-result* [ ]
       |     +--ro start-time?                                 yang-types:date-and-time
       |     +--ro end-time?                                   yang-types:date-and-time
       |     +--ro transceiver-measurement-result* [object-unit-id]
       |        +--ro object-unit-id                           -> /if:interfaces/interface/o-ran-
int:port-reference/port-number
       |           +--ro min
       |           |     +--ro value?                          decimal64
       |           |     +--ro time?                           yang-types:date-and-time
       |           +--ro max
       |           |     +--ro value?                          decimal64
       |           |     +--ro time?                           yang-types:date-and-time
       |           +--ro first
       |           |     +--ro value?                          decimal64
       |           |     +--ro time?                           yang-types:date-and-time
       |           +--ro latest
       |           |     +--ro value?                          decimal64
       |           |     +--ro time?                           yang-types:date-and-time
       |           +--ro frequency-table*                      uint32
       +--ro multiple-rx-windo-stats* [measurement-object]
       |  +--ro measurement-object                             -> /performance-measurement-
objects/rx-window-measurement-objects/measurement-object
       |  +--ro additional-rx-window-measurement-result* [ ]
       |     +--ro start-time?                                 yang-types:date-and-time
       |     +--ro end-time?                                   yang-types:date-and-time
       |     +--ro (object-unit-id)?
       |        +--:(RU)
       |        |  +--ro name?                                 -> /hw:hardware/component/name
       |        |  +--ro count                                 uint64
       |        +--:(TRANSPORT)
       |        |  +--ro tr-measured-result* [ ]
       |        |     +--ro name?                              -> /o-ran-elements:processing-
elements/ru-elements/name
       |        |     +--ro count                              uint64
       |        +--:(EAXC_ID)
       |           +--ro eaxc-measured-result* [ ]
       |              +--ro eaxc-id?                           uint16
       |              +--ro count                              uint64
       |              +--ro data-direction?                    enumeration
       |              +--ro transport-name?->/o-ran-elements:processing-
elements/ru-elements/name
       +--ro multiple-tx-stats* [measurement-object]
          +--ro measurement-object                             -> /performance-
measurement-objects/tx-measurement-objects/measurement-object
          +--ro additional-tx-measurement-result* [ ]
             +--ro start-time?                                 yang-types:date-and-time
             +--ro end-time?                                   yang-types:date-and-time
             +--ro (object-unit-id)?
                +--:(RU)
                |  +--ro name?                                 -> /hw:hardware/component/name
                |  +--ro count                                 uint64
                +--:(TRANSPORT)
                |  +--ro tr-measured-result* [ ]
                |     +-ro name? ->                            /o-ran-elements:processing-
```

```
elements/ru-elements/name
      |                          |              +--ro count              uint64
      |                  +--:(EAXC_ID)
      |                     +--ro eaxc-measured-result* [ ]
      |                              +--ro eaxc-id?              uint16
      |                              +--ro count                 uint64
      |                              +--ro transport-name?->/o-ran-elements:processing-
elements/ru-elements/name
         +--ro multiple-epe-statistics* [measurement-object]
              +--ro measurement-object                        -> /performance-measurement-
objects/epe-measurement-objects/measurement-object
              +--ro additional-epe-measurement-result* [ ]
                   +--ro start-time?                          yang-types:date-and-time
                   +--ro end-time?                            yang-types:date-and-time
                   +--ro epe-measurement-result* [object-unit-id]
                        +--ro object-unit-id                  -> /hw:hardware/component/class
                        +--ro min?                            decimal64
                        +--ro max?                            decimal64
                        +--ro average?                        decimal64
``` result-stats, which is a notification for delivering one measurement result, may be used without modification, and multiple-measurement-result-stats, which is a notification for delivering a plurality of measurement results, may be newly defined. The O-RU may generate additional-measurement-result[ ] including a plurality of measurement results, and may transmit additional-XXX-measurement-result[ ]. Except for defining a part for delivery of a plurality of measurement results as a separate notification, the rest of the details may be the same as in [Method A].

The above-described exemplary embodiment may be a modified Method c of [Method A], and a separate notification may be used. The O-RU may use the existing measurement-result-stats notification including leafs (e.g., start-time, end-time, and XXX-measurement-result[ ]) supporting transmission of one measurement result to transmit one measurement result to the existing O-DU, and may transmit a new multiple-measurement-result-stats including all of the plurality of measurement results to the new O-DU. multiple-measurement-result-stats may include additional XXX-measurement-result[ ], and additional-measurement-result[ ] may include a plurality of measurement results. All measurement results (e.g., measurement results from the first measurement result to the last measurement result) may be arranged in chronological order within additional-XXX-measurement-result[ ].

The existing measurement-result-stats notification transmitted to the existing may include one measurement result for each measurement object. In this case, the existing O-DU may set the measurement interval and the notification interval of the O-RU to be the same so that one measurement result is generated at one notification interval. Alternatively, when the existing O-DU sets the notification interval to be longer than the measurement interval, the O-RU may transmit the existing measurement-result-stats notification including the most recent measurement result among the measurement results to the O-DU. Detailed methods for the above-described operations are described in <Method for ensuring backward compatibility and interoperability with equipment that does not support a multi-measurement result reporting function>.

When Method a, Method b, and/or Method d of [Method A] is used, the existing leafs and the new list may be transmitted as separate notifications in the same manner as in the above-described method. That is, in Method a, Method b, and/or Method d of [Method A], one measurement result may be transmitted using the existing measurement-result-stats notification (i.e., existing leafs), and a plurality of measurements results may be transmitted using the multiple-measurement-result-stats notification (i.e., new list)

When multiple-stats-in-notification-capable of the O-RU is set to FALSE, the may identify only the measurement-result-stats notification (i.e., the existing notification) including one measurement result. When multiple-stats-in-notification-capable of the O-RU is set to TRUE, the O-DU may set enable-multiple-stats-in-notification to TRUE, and may receive the multiple-measurement-result-stats notification including a plurality of measurement results (i.e., new notification). Even when the O-RU supports the multi-measurement result reporting function, in order to reduce the burden on the O-DU, the O-DU may set enable-multiple-stats-in-notification to FALSE. In this case, the O-RU may transmit the measurement-result-stats notification including one measurement result to the O-DU, and the O-DU may receive the measurement-result-stats notification including one measurement result from the O-RU. Alternatively, the O-DU may receive the multiple-measurement-result-stats notification including one measurement value, and may obtain only the one measurement result from the multiple-measurement-result-stats notification.

When the O-RU does not use multiple-stats-in-notification-capable of the YANG model, the O-DU may subscribe to both the measurement-result-stats notification and the multiple-measurement-result-stats notification. In this case, when the O-RU transmits a notification including a plurality of measurement results, the O-DU may receive the multiple-measurement-result-stats notification from the O-RU. When the O-RU transmits the existing notification including one measurement result, the O-DU may receive the existing measurement-result-stats notification from the O-RU.

The existing O-DU may not support the multi-measurement result reporting function, and may only subscribe to the existing measurement-result-stats. In this case, if the default value of enable-multiple-stats-in-notification is set to FALSE, the existing O-DU may not set enable-multiple-stats-in-notification separately. Therefore, the O-RU may transmit the existing measurement-result-stats notification including one measurement result to the existing O-DU.

The new O-RU may optionally support the multiple-measurement-result-stats notification, and both multiple-stats-in-notification-capable and enable-multiple-stats-in-notification may not be added to the YANG model. The O-RU may support the multi-measurement result reporting function, and the O-DU may subscribe to the multiple-measurement-result-stats notification. In this case, the O-DU may receive one notification including a plurality of measurement results.

When the O-RU does not support the multiple-measurement-result-stats notification, the O-DU may receive a notification including one measurement result by subscribing to the existing measurement-result-stats notification. In this case, since the O-DU does not know the capability of the O-RU related to the plurality of measurement results, it should subscribe to both the existing measurement-result-stats notification and the new multiple-measurement-result-stats notification. Since the existing O-DU cannot subscribe to the new multiple-measurement-result-stats notification, it may not receive the multiple-measurement-result-stats notification from the O-RU. Accordingly, an error may not occur.

When the existing O-DU operates with the new O-RU, and the existing O-DU sets the measurement interval and the notification interval of the new O-RU to be the same, it may be prevented that the existing O-DU receives one notification (e.g., multiple-measurement-result-stats notification) including a plurality of measurements from the new O-RU. That is, since one measurement result occurs at one notification interval, the new O-RU may transmit the existing measurement-result-stats notification including one measurement result. When the above-described method is used, multiple-stats-in-notification-capable and enable-multiple-stats-in-notification may not be used. The operation described above may be useful in Method c.

When Method c is used, the existing O-DU may set the measurement interval and the notification interval to be the same so that one measurement result occurs at one notification interval. In this case, the O-RU may transmit the existing leafs including one measurement result (e.g., through the measurement-result-stats notification). The existing O-DU may decode one measurement result included in the leafs included in the existing notification received from the O-RU. The new O-DU may set the notification interval to be longer than the measurement interval. In this case, if a plurality of measurement results occur at one notification interval, the O-RU may transmit a new list (e.g., through a new multiple-measurement-result-stats notification) including a plurality of measurement results to the new O-DU. The new O-DU may decode the plurality of measurement results included in the new list included in the multiple-measurement-result-stats notification received from the O-RU. That is, when the notification interval is longer than the measurement interval, the multi-measurement result reporting function may be enabled. If the notification interval is not longer than the measurement interval, the multi-measurement result reporting function may be disabled.

In Method a, Method b, and/or Method d, the existing leafs including one measurement result may be transmitted. Therefore, since the existing O-DU can decode the existing leafs, a backward compatibility problem may not occur. When one measurement result exists, the existing measurement-result-stats notification may be used. In this case, both the existing O-DU and the new O-DU may decode the measurement result. When a plurality of measurement results exist, both the existing measurement-result-stats notification and the new multiple-measurement-result-stats notification may be transmitted. In this case, the existing O-DU may obtain the one measurement result by receiving the existing measurement-result-stats notification, and the new O-DU may obtain the plurality of measurement results by receiving the new multiple-measurement-result-stats notification.

Even when there is one measurement result in Method d, both the existing measurement-result-stats notification including one measurement result and the new multiple-measurement-result-stats notification including one measurement result may be transmitted. That is, the same measurement result may be included in the existing measurement-result-stats notification and the new multiple-measurement-result-stats notification.

The modified YANG code for the method(s) described above may be defined as follows.

```
grouping multiple-measurement-notification {
    description
        "notification may contain multiple-measurement result for transceiver-stats and/or rx-window-stats and/or tx-stats and/or epe-stats";
    list multiple-transceiver-stats {
        key "measurement-object";
        description
            "multiple measurement result of transceiver-measurement per measurement-object";
        leaf measurement-object {
            type leafref {
                path        "/performance-measurement-objects/transceiver-measurement-objects/measurement-object";
            }
            description
                "measurement-object for the transceiver-measurement";
        }
        list additional-transceiver-measurement-result {
            config false;
            description
                "additional measurement result of transceiver-measurement
                when notification-interval is larger than measurement-interval";
            uses start-and-end-time;
            uses transceiver-measurement-result-grouping;
        }
    }
    list multiple-rx-window-stats {
        key "measurement-object";
        description
            "multiple measurement result for the reception window measurement per measurement-object";
```

-continued

```
        leaf measurement-object {
          type leafref {
            path        "/performance-measurement-objects/rx-window-
    measurement-objects/measurement-object";
          }
          description
            "measurement-object for the reception window measurement";
        }
        list additional-rx-window-measurement-result {
          config false;
          description
            "additional measurement result of rx-window-measurement
             when notification-interval is larger than measurement-interval";
          uses start-and-end-time;
          uses rx-window-measurement-result-grouping;
        }
      }
      list multiple-tx-stats {
        key "measurement-object";
        description
          "multiple measurement result for the tx stats measurement per
           measurement-object";
        leaf measurement-object {
          type leafref {
            path        "/performance-measurement-objects/tx-measurement-
    objects/measurement-object";
          }
          description
            "measurement-object for the tx stats measurement";
        }
        list additional-tx-measurement-result {
          config false;
          description
            "additional measurement result of tx-measurement
             when notification-interval is larger than measurement-interval";
          uses start-and-end-time;
          uses tx-measurement-result-grouping;
        }
      }
      list multiple-epe-statistics {
        key "measurement-object";
        description
          "measurement result for the epe stats measurement per
           measurement-object";
        leaf measurement-object {
          type leafref {
            path        "/performance-measurement-objects/epe-measurement-
    objects/measurement-object";
          }
          description
            "measurement-object for the epe stats measurement";
        }
        list additional-epe-measurement-result {
          config false;
          description
            "additional measurement result of epe-measurement
             when notification-interval is larger than measurement-interval";
          uses start-and-end-time;
          uses epe-measurement-result-grouping;
        }
      }
    }
    // Top level container
    container performance-measurement-objects {
      description
        "configuration for performance management and measurement-result
    are included";
      uses measurement-group;
    }
    // Notifications
      notification measurement-result-stats
        description
          "Notification may contain measurement results for transceiver-stats
    and/or rx-window-stats";
        uses measurement-notification;
      }
      notification multiple-measurement-result-stats {
        description
          "Notification may contain multiple measurement results for
```

```
transceiver-stats and/or rx-window-stats";
    uses multiple-measurement-notification;
  }
}
```

According to the above-described method, a backward compatibility problem with the existing equipment (e.g., O-DU or O-RU) may not occur. In the transmission procedure of one NETCONF notification, a plurality of measurement results for each measurement object may be transmitted. Accordingly, the performance of the O-RAN M-Plane can be improved.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. An operation method of an open-radio access network (O-RAN) radio unit (O-RU) in an O-RAN, the operation method comprising:
    generating a plurality of first measurement results by performing a measurement operation on a first measurement object in one notification period according to a notification interval;
    generating a first measurement result list including the plurality of first measurement results; and
    transmitting a message including the first measurement result list to an O-RAN distributed unit (O-DU).

2. The operation method according to claim 1, further comprising generating a first notification including a most recent measurement result among the plurality of first measurement results, wherein the message further includes the first notification.

3. The operation method according to claim 2, wherein the first measurement result list is decoded by an O-DU supporting a version after a specific version of the O-RAN, and the first notification is decoded by an O-DU supporting a version before the specific version.

4. The operation method according to claim 1, further comprising:
    generating a plurality of second measurement results by performing a measurement operation on a second measurement object in the one notification period; and
    generating a second measurement result list including the plurality of second measurement results,
    wherein the message further includes the second measurement result list.

5. The operation method according to claim 1, wherein the first measurement result list further includes information on a measurement start time and a measurement end time for each of the plurality of first measurement results.

6. The operation method according to claim 1, wherein the plurality of first measurement results are arranged in ascending order of measurement time in the first measurement result list.

7. The operation method according to claim 1, wherein the first measurement result list further includes at least one of information indicating a number of the plurality of first measurement results and a sequence number of each of the plurality of first measurement results.

8. The operation method according to claim 1, wherein the notification interval is set by the O-DU to be longer than a measurement interval at which one measurement operation is performed.

9. The operation method according to claim 1, wherein the first measurement object is a transceiver, a reception window (rx-window), a transmission measurement (tx-measurement), 'energy, power, environmental (EPE)', or a symbol received signal strength indicator (RSSI).

10. An operation method of an open-radio access network (O-RAN) radio unit (O-RU) in an O-RAN, the operation method comprising:
    generating a first measurement result by performing a measurement operation on a first measurement object in one notification period according to a notification interval;
    generating a first notification including the first measurement result;
    generating a first measurement result list including the first measurement result; and
    transmitting a message including the first notification and the first measurement result list to an O-RAN distributed unit (O-DU).

11. The operation method according to claim 10, wherein the first measurement result list is decoded by an O-DU supporting a version after a specific version of the O-RAN, and the first notification is decoded by an O-DU supporting a version before the specific version.

12. The operation method according to claim 10, wherein the notification interval is set by the O-DU to be equal to a measurement interval at which one measurement operation is performed.

13. The operation method according to claim 10, further comprising:
    generating a second measurement result by performing a measurement operation on a second measurement object in the one notification period;
    generating a second notification including the second measurement result; and
    generating a second measurement result list including the second measurement result, wherein the message further includes the second notification and the second measurement result list.

14. An operation method of an open-radio access network (O-RAN) distributed unit (O-DU) in an O-RAN, the operation method comprising:
setting a notification interval and a measurement interval for an O-RAN radio unit (O-RU);
receiving, from the O-RU, a message including a first measurement result list including a plurality of first measurement results for a first measurement object; and
identifying the plurality of first measurement results by decoding the first measurement result list,
wherein the plurality of first measurement results are measured in one notification period according to the notification interval.

15. The operation method according to claim 14, wherein the message further includes a first notification including a most recent measurement result among the plurality of first measurement results.

16. The operation method according to claim 15, wherein the first measurement result list is decoded by an O-DU supporting a version after a specific version of the and the first notification is decoded by an O-DU supporting a version before the specific version.

17. The operation method according to claim 14, wherein the first measurement result list further includes information on a measurement start time and a measurement end time of each of the plurality of first measurement results.

18. The operation method according to claim 14, wherein the plurality of first measurement results are arranged in ascending order of measurement time in the first measurement result list.

19. The operation method according to claim 14, wherein the first measurement result list further includes at least one of information indicating a number of the plurality of first measurement results and a sequence number of each of the plurality of first measurement results.

20. The operation method according to claim 14, wherein the first measurement object is a transceiver, a reception window (rx-window), a transmission measurement (tx-measurement), 'energy, power, environmental (EPE)', or a symbol received signal strength indicator (RSSI).

* * * * *